(12) United States Patent
Reeder et al.

(10) Patent No.: US 11,709,509 B2
(45) Date of Patent: Jul. 25, 2023

(54) SMART ENERGY SCHEDULING OF HVAC SYSTEM DURING ON-PEAK HOURS

(71) Applicant: Alarm.com Incorporated, Tysons, VA (US)

(72) Inventors: Alexander Lawrence Reeder, Ridgefield, CT (US); Caspar John Anderegg, Minneapolis, MN (US); Gustaf Nicolaus Maxwell Lonaeus, Washington, DC (US); William Converse Blanchard, Arlington, VA (US); Jean-Paul Martin, Oakton, VA (US); Benjamin Michael Machlin, Centennial, CO (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/666,901

(22) Filed: Feb. 8, 2022

(65) Prior Publication Data

US 2022/0253078 A1 Aug. 11, 2022

Related U.S. Application Data

(60) Provisional application No. 63/147,551, filed on Feb. 9, 2021.

(51) Int. Cl.
*G05D 23/19* (2006.01)

(52) U.S. Cl.
CPC ..... *G05D 23/1904* (2013.01); *G05D 23/1923* (2013.01)

(58) Field of Classification Search
None
See application file for complete search history.

(56) References Cited

U.S. PATENT DOCUMENTS

| | | |
|---|---|---|
| 5,454,511 A | 10/1995 | Van Ostrand et al. |
| 6,006,142 A | 12/1999 | Seem et al. |
| 6,196,468 B1 | 3/2001 | Young |
| 6,628,997 B1 | 9/2003 | Fox et al. |
| 7,861,941 B2 | 1/2011 | Schultz et al. |
| 8,136,738 B1 | 3/2012 | Kopp |
| 8,359,124 B2 | 1/2013 | Zhou et al. |
| 9,618,225 B2 | 4/2017 | Rylski et al. |
| 9,945,574 B1 | 4/2018 | Sloo et al. |

(Continued)

OTHER PUBLICATIONS

PCT International Search Report and Written Opinion in International Appln. No. PCT/US2022/070565, dated Apr. 27, 2022, 10 pages.

*Primary Examiner* — Bernard G Lindsay
(74) *Attorney, Agent, or Firm* — Fish & Richardson P.C.

(57) ABSTRACT

Systems and techniques are described for monitoring energy use habits of consumers. In some implementations, a method includes obtaining temperature data from a monitored property. An energy model of the monitored property is generated based on the obtained temperature data. The current temperature data is obtained from the monitored property. The current temperature data is provided to the generated energy model to generate a duty-cycle for turning an HVAC system of the monitored property off an on during the on-peak hours. The HVAC system of the monitored property is instructed to cycle off and on during the on-peak hours based on the generated duty-cycle.

17 Claims, 10 Drawing Sheets

(56) References Cited

U.S. PATENT DOCUMENTS

| | | |
|---|---|---|
| 10,001,789 B2 | 6/2018 | Hunka |
| 10,443,873 B1 | 10/2019 | Johnson et al. |
| 11,060,745 B1 | 7/2021 | Johnson et al. |
| 2005/0090915 A1 | 4/2005 | Geiwitz |
| 2007/0210177 A1 | 9/2007 | Karasek |
| 2009/0171506 A1 | 7/2009 | Donaldson et al. |
| 2010/0084482 A1 | 4/2010 | Kennedy et al. |
| 2012/0048955 A1 | 3/2012 | Lin et al. |
| 2012/0053745 A1 | 3/2012 | Ng |
| 2012/0261079 A1 | 10/2012 | Chambers et al. |
| 2014/0001977 A1* | 1/2014 | Zacharchuk .............. H02J 3/14 323/318 |
| 2014/0058567 A1 | 2/2014 | Matsuoka et al. |
| 2014/0135998 A1 | 5/2014 | Car et al. |
| 2014/0142904 A1* | 5/2014 | Drees .................... G06Q 10/04 703/2 |
| 2014/0316584 A1 | 10/2014 | Matsuoka et al. |
| 2015/0168933 A1 | 6/2015 | Klein et al. |
| 2015/0276239 A1* | 10/2015 | Fadell ................. H04L 12/6418 236/51 |
| 2016/0341435 A1 | 11/2016 | Rabb et al. |
| 2017/0102158 A1* | 4/2017 | Chandan ................ G05B 15/02 |
| 2017/0205105 A1 | 7/2017 | Adam et al. |
| 2017/0206615 A1* | 7/2017 | Sloop ...................... F24F 11/30 |
| 2018/0252427 A1 | 9/2018 | Hieke et al. |
| 2020/0300491 A1 | 9/2020 | Matsuoka et al. |
| 2021/0341164 A1 | 11/2021 | Johnson et al. |

\* cited by examiner

400

```
┌─────────────────────────────────────┐
│  Obtaining temperature data from a  │
│         monitored property          │
│                                 402 │
└─────────────────────────────────────┘
                  │
                  ▼
┌─────────────────────────────────────┐
│  Generating an energy model of the  │
│ monitored property based on the     │
│     obtained temperature data       │
│                                 404 │
└─────────────────────────────────────┘
                  │
                  ▼
┌─────────────────────────────────────┐
│  Obtaining current temperature data │
│       from the monitored property   │
│                                 406 │
└─────────────────────────────────────┘
                  │
                  ▼
┌─────────────────────────────────────┐
│ Providing the current temperature   │
│ data to the generated energy model  │
│ to generate a duty-cycle for        │
│ turning an HVAC system of the       │
│ monitored property off and on       │
│ during on-peak hours            408 │
└─────────────────────────────────────┘
                  │
                  ▼
┌─────────────────────────────────────┐
│ Instructing the HVAC system of the  │
│ monitored property to cycle off and │
│ on based on the generated           │
│ duty-cycle during the on-peak hours │
│                                 410 │
└─────────────────────────────────────┘
```

FIG. 4

SMART ENERGY SCHEDULING OF HVAC SYSTEM DURING ON-PEAK HOURS

CROSS-REFERENCE TO RELATED APPLICATION

This application claims the benefit of U.S. Provisional Application No. 63/147,551 filed Feb. 9, 2021, and titled "Smart Energy Scheduling," which is incorporated herein by reference.

TECHNICAL FIELD

This specification generally relates to monitoring technology and, for example, Heating Ventilation and Air Conditioning (HVAC) systems.

BACKGROUND

HVAC systems may perform cooling functions by circulating air over evaporator coils to remove heat from the air, and heating functions by using a furnace to heat air from a source vent and blowing the heated air through return vents.

SUMMARY

The subject matter of the present disclosure is related to techniques for improving energy management in a monitored property. Generally, this includes monitoring and obtaining data associated with the heating, ventilation, and air conditioning (HVAC) systems, thermostats measuring temperature inside and outside the monitored property, appliances in the property, and energy use habits of individuals in the monitored property. The techniques facilitate using the obtained data to generate an energy model of the monitored property to monitor proper energy usages for the devices and to generate a predictive "comfort" model for the residents that meet their desires. By generating and applying these models, the techniques can generate optimal control of the devices in the monitored property to derive optimal energy usage, generate savings for the residents, improve overall comfort for the residents, and enhance peace of mind.

In one general aspect, a method performed by one or more processors includes: obtaining, by one or more processors, temperature data from a monitored property; generating, by the one or more processors, an energy model of the monitored property based on the obtained temperature data; obtaining, by the one or more processors, current temperature data from the monitored property; providing, by the one or more processors, the current temperature data to the generated energy model to generate a duty-cycle for turning an HVAC system of the monitored property off and on during on-peak hours; and instructing, by the one or more processors, the HVAC system of the monitored property to cycle off and on based on the generated duty-cycle during the on-peak hours.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes in response to a predetermined amount of time before a start of on-peak hours, obtaining, by the one or more processors, the current temperature data from the monitored property, wherein the current temperature data comprises at least one of an outdoor temperature at the monitored property, an indoor temperature at the monitored property, a rate of change of the indoor temperature at the monitored property.

In some implementations, the method includes wherein the on-peak hours corresponds a to a time period in which a utility company can charge a customer a maximum power consumption rate across the time period.

In some implementations, the method includes in response to an end of the on-peak hours and the HVAC system of the monitored property cycling off and on based on the generated duty-cycle, setting, by the one or more processors, a desired temperature of the monitored property that mitigates a whip back effect of an electric grid.

In some implementations, the method includes prior to a time period during the on-peak hours, instructing, by the one or more processors, the HVAC system of the monitored property to execute a pre-cooling method, wherein the pre-cooling method instructs the HVAC system to reach a set temperature in the monitored property before the on-peak hours.

In some implementations, the method includes instructing, by the one or more processors, the HVAC system to duty-cycle between a first temperature and a second temperature during the on-peak hours, wherein (i) the generated duty-cycle is cycled between the first temperature and the second temperature and (ii) the set temperature of the pre-cooling method corresponds to the second temperature, wherein the second temperature is greater than the first temperature; in response to instructing the HVAC system of the monitored property to cycle off and on based on the generated duty cycle, monitoring, by the one or more processors, a proximity to which an actual temperature of the monitored property reaches the first temperature iteratively; and adjusting, by the one or more processors, the generated duty cycle based on the proximity to which the actual temperature of the monitored property reaches the first temperature.

In some implementations, the method includes wherein obtaining the data from the monitored property further comprises obtaining, by the one or more processors, a size of the monitored property, an amount of airflow produced in the monitored property, and a temperature outdoor the monitored property.

In some implementations, the method includes providing, by the one or more processors, a user interface to a client device of a user associated with the monitored property; receiving, by the one or more processors, an indication from the client device of a specific duty cycle for the HVAC system; and instructing, by the one or more processors, the HVAC system of the monitored property to cycle off and on based on the specific duty cycle selected by the user.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flowchart of an example process for determining a duty-cycle for a thermostat to operate in order to implement the smart scheduling system during on-peak hours.

Like reference numbers and designations in the various drawings indicate like elements.

DETAILED DESCRIPTION

Figure 1:
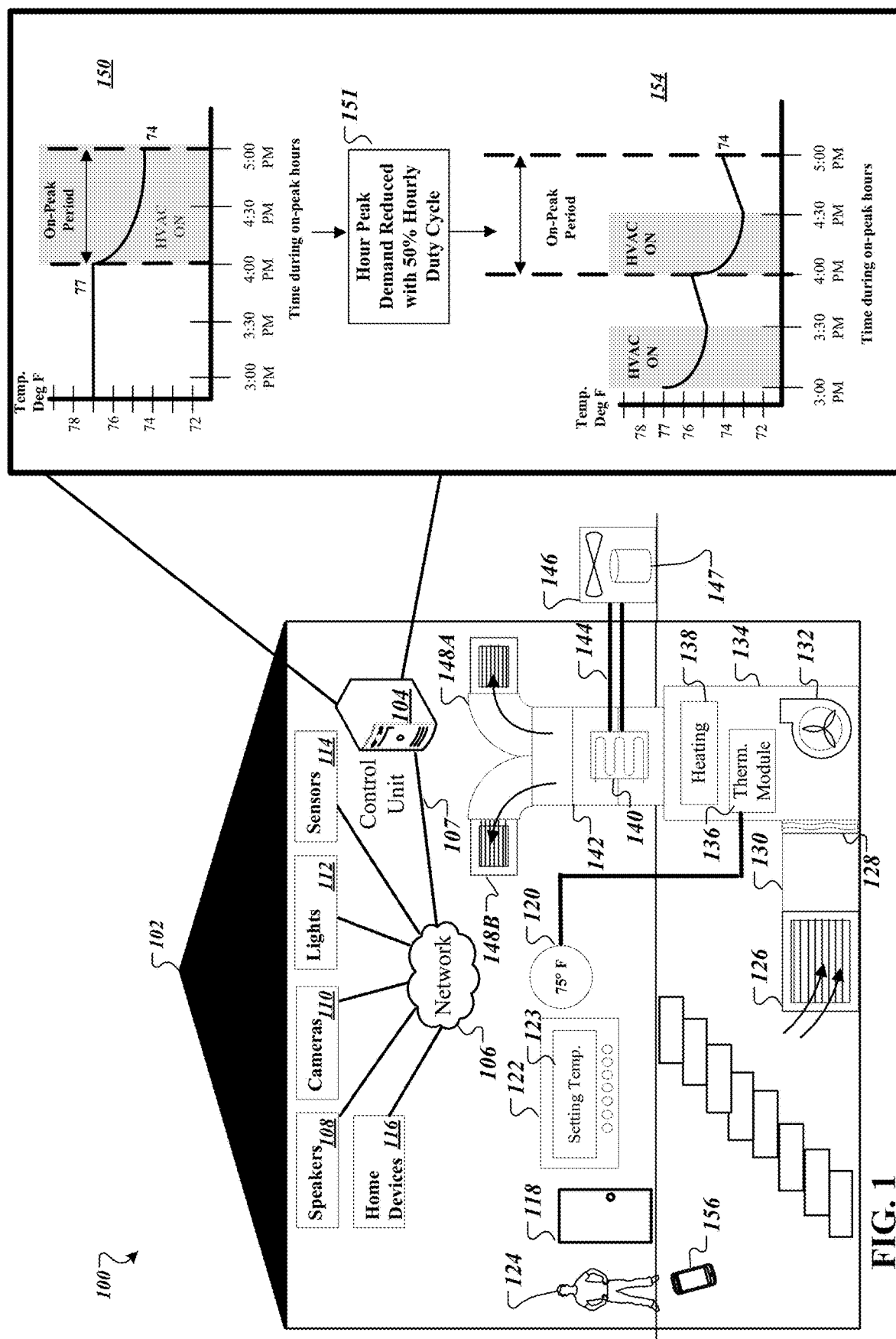
FIG. 1 is a contextual diagram of an example environment for monitoring a property that is implementing a smart scheduling system.

In some implementations, the technology described in this disclosure is related to energy management in a monitored property. Energy management may be based on monitoring energy use habits of individuals in a monitored property. The techniques may enable usage of obtaining data to generate an energy model of a modeled property to monitor proper energy usages for the devices and to generate a predictive "comfort" model for the residents that meet their desires. By generating and applying this predictive model, the model can be used to control the devices in the monitored property to derive optimal energy usage, generate energy cost savings for the residents, improve overall comfort, and enhance peace of mind for residents in their property.

Typically, electric usage in southwestern and other parts of the United States can be tied to outdoor temperature by the use of air conditioning. The electric grid tries to modernize this connection by incorporating solar and wind energy as intermittent electricity sources, which can create issues for the utility companies, in terms of ramping the energy required to use these devices. For example, electricity usage continues to rise in a hot afternoon in the southwestern part of the United States as people arrive home from work at the end of the day. Consequently, utility companies have created rate plans called time of use (hereinafter, TOU), time of day, and TOU plus demand rate plans, that incentivize their customers to use less energy during the peak times of the day. Under these schemes, customers may pay different prices for a kilowatt-hour (kWh) at certain times of the day—higher prices during periods that have lower generation and higher demand, e.g., on-peak periods. Typically, the highest prices occur in the late afternoon and evening when solar production is decreasing and residents arrive home for the day due to, for example, running HVAC, cooking dinner with microwave, stove, and oven, and plugging in their electric vehicle for charging purposes.

Additionally, the utility companies can provide their customers a discount during on and off-peak times of the day. Typically, customers may allow utility companies to control their thermostat to offset the electricity spikes that may harm the electrical grid, which may occur 3-6 days out of the year, in exchange for an annual fee.

In some implementations, these techniques may use smart schedules for energy consumption at a monitored property. However, some variation occurs when using these schedules. In particular, customers often do not set up schedules often enough; customers' schedules change regularly in most cases due to changes in life style and seasons; and, customers may take one-off trips that may turn into cost savings (or lack of comfort) at their monitored property. Thus, more steps can be taken to ensure a consistent and energy savings smart scheduler remains in effect to account for these variations.

The techniques in this disclosure affect the thermostat each day out of the year during the on-peak period. Rather than participating in one off events, many customers and residents of a monitored property can search for methods to adapt to these rate plans to meet the utility's strategic goal of reducing on-peak power consumption, and specifically, in the high demand usage within the on-peak power period. For example, one technique includes adapting a resident's rate plan to utilize electricity and/or energy in their monitored property in a manner that utilities prefer, which ultimately saves the residents money.

In some implementations, the benefits of these techniques' optimization scheme is twofold. First, for the resident of the monitored property, a variety of benefits exists. These include, for example, reducing energy usage and cost of energy usage while maintaining maximum comfort for a given amount of energy savings. Additionally, another benefit includes a greatly reduced complexity scheme for managing various monitored property devices and sensors. Lastly, the resident is offered peace of mind in terms of the comfort of their monitored property. Second, for the electric utility company, benefits include increased customer adherence to TOU rates (while improving customer satisfaction). This includes decreasing electricity utility costs to run peaking plants (or otherwise accommodate change based on demand). Additionally, utility companies may enable more customers to opt in to TOU (or other variable) rate plans, which can be a key long term and short-term goal. In some implementations, by implementing this schedule, utility companies can minimize "whip back" at the end of a TOU period. Whip back can refer to an effect that occurs immediately following an on-peak billing period when electricity usage jumps dramatically due to the price drop and pent up demand that was waiting for the on-peak period to end. For example, where HVAC systems can suddenly engage at the end of an on-peak period. Whip back can occur because most resident's schedules are fully time-based and the schedules return to the temperature the customer desires as soon as energy is cheaper. Lastly, not only does electric utility companies have more satisfied customers, but may be able to provide firmer utility load, by having more reliable HVAC set point changes.

In some implementations, electric utility companies may offer a standard time of use rate plan. The standard time of use rate plan may have a two to three tier system that can change depending upon the time of season (spring, summer, and winter, for example). Essentially, customers may pay one volumetric rate off-peak hours and another volumetric rate during on-peak hours. In some implementations, volumetric rate corresponds to a price per kilowatt-hour to be consumed. Originally, demand rate derives from commercial and industrial space, but the electric utility companies have adapted demand rates for the residential communities. In particular, electric utility companies offer a discount on the volumetric rate for both the on-peak and off-peak hours so that the customer may receive a 50% discount on the per kilowatt hour rate. However, electric utility companies compensate for the lost cost by charging its customer a monthly surcharge based on maximum peak power used during any billing period (such as, 30 or 60 minutes, for example) during on-peak hours for the entire month. This is the customers demand charge. For example, during the month of June, a customer may use 10 kWh of on-peak electricity every day in that month. One of those days, the customer can utilize 2 kWh for each of the 5 on-peak hours and on the last day of the month, may use 10 kWh during 1 hour and 0 kWh for the remainder of the 5 hours. Consequently, the utility company may charge the customer for 10 kW, which is referred to as the demand or kilowatt charge. The electric utility company can analyze the period of greatest energy usage during on-peak hours and charge the customer based on that greatest average power usage during that period (i.e., 10 kW).

In some implementations, various electric utility companies may charge customers various prices for seasonal rates. These prices may include a basic service charge per day (kWh), off-peak energy charge (kWh), on-peak energy charge (kWh), and a seasonal demand charge (kW). The demand charge is charged to customers in dollars per kilowatt, which charges customers based on the highest hour of energy usage during certain days. For example, if a customer uses 5 kilowatts average during his/her on-peak hours of greatest use, then the electric company may charge the customer the demand charge times the 5 kW (i.e., if the demand charge is $20/kW, then the charge can correspond to $20/kW times 5 kW, or $100 dollars) in addition to the volumetric charge during on-peak hours.

The manner in which customers save money during these rate plans is by utilizing or leveling his or her energy usage during on-peak hours. In some implementations, customers may maximize the ratio of kWh consumed to max kilowatts consumed during that on-peak period, to keep that demand charge as small as possible while still utilizing energy during the on-peak period and taking advantage of that discounted price for on-peak per kWh energy consumption.

During off-peak hours, the customer can use any device at the monitored property he/she desires. For example, the customer can use 15 kWh and may only be charged the off-peak amount per kWh, such as 5.20 cents per kWh. In addition to being charged per kilowatt-hour during the on-peak hours, the customers need to ensure they are not utilizing too many appliances at once to keep the demand charge low. For example, during on-peak hours, the customer may avoid running the dishwasher as the same time as the drier, and only use one appliance at a time. The way to keep track of the simultaneous running of devices is to synchronize the monitored property's HVAC system usage such that the customer only uses a certain number of minutes of air conditioning per hour (i.e. a set duty-cycle), and a control unit of the monitored property may run models to ensure that if a customer runs other devices during the on-peak periods, the control unit may take off-setting actions. The off-setting actions can include, for example, reducing the air conditioning or turning off an additional appliance, such that the demand charge for that month does not exponentially grow.

For example, the control unit may adapt to this situation such that from 12:00 PM to 3:00 PM, the HVAC executes a pre-cooling method cooling down the monitored property. This pre-cooling method may use a large amount of electricity right before the on-peak period, set by the electric utility company hits. Then, if the customer is comfortable at 75 degrees Fahrenheit (F), the control unit may set the thermostat temperature to 71 F, and at 3:00 PM, the control unit would change the temperature to 75 F. At that point, the air conditioner (A/C) can remain off for 3 hours until the indoor temperature of the monitored property hits 75 F. At that point, the A/C can turn on, but since this may be considered the hottest part of the day in southwestern United States, the air conditioner can remain on at a particular duty-cycle (such as, 80%) for every hour of the remaining 3 hour of the on-peak period to maintain that 75 F while keeping the demand charge low.

This method works great for traditional TOU systems, but for TOU plus demand charge systems, the monitored property may be using more electricity per billing period than the monitored property may have performed for those last 3 hours in the beginning when the air conditioning was off for the first 2 hours (assuming on-peak hours is 5 hours long). Instead of being off for 2 hours and on at 75% duty-cycle, the control unit of the monitored property may set a 50% duty-cycle for the entire duration of the on-peak period (e.g., 30 minutes on and 30 minutes off in an hour). In some examples, 50% duty-cycle can also be 30 minutes off then 30 minutes on. Even though the indoor temperature of the monitored property is set to 71 F because of the pre-cooling, the control unit may still cool the monitored property at 50% duty-cycle or 30 minutes out of that hour. Even though the monitored property's thermostat is telling the resident that the monitored property is cold (and even uncomfortably cold), this is necessary in order to ensure the monitored property's temperature does not go above the target temperature of 75 F later on because it is more beneficial to cool for 30 minutes every hour during the on-peak period. Thus, with some of these electric utility rate plans, the customer can utilize 50% more on-peak electricity and still have a lower total cost because the customer is receiving a lower volumetric rate (during on-peak) while maintaining a low demand charge. In other examples, the control unit of the monitored property may set a 90% duty-cycle for the entire duration of the on-peak period, e.g., 54 minutes on and 6 minutes off in an hour. Other examples of a set duty-cycle may be used, such as 10%, 20%, 35%, to name a few examples.

FIG. 1 is a contextual diagram of an example environment 100 for monitoring a property 102 that is implementing a smart scheduling system. Though environment 100 is shown and described including a particular set of components including a control unit 104, a network 106, speakers 108, cameras 110, lights 112, sensors 114, home devices 116, HVAC system 134, the present disclosure need not be so limited. For instance, in some implementations only a subset of the aforementioned components may be used by the environment 100 for monitoring property 102. As an example, there may be implementations that do not use the speakers 108. Similarly, there may be implementations that the control unit 104 is external to the monitored property 102. Yet other alternative exemplary systems also fall within the scope of the present disclosure such as a system that does not use a control unit 104. For these reasons, the environment 100 should not be viewed as limiting the present disclosure to any particular set of necessary components.

As shown in FIG. 1, a monitored property 102 owned by owner 124 is monitored by a control unit 104 that includes components within the monitored property 102. The environment 100 further includes an alarm panel 122 with a message display 123, a thermostat 120, and an HVAC system 134, which includes a return air duct 126, air duct 130, an air filter 128, a blower 132, a thermostat module 136, a heating module 138, an evaporator coil 140, air-handling unit 142, refrigerant filled tubing 144, outdoor compressor 146, and supply air grills 148A and 148B. The thermostat 120 may display a temperature to set the monitored property 102. The return air duct 126 is a duct that can carry air from a conditioned air space, such as the monitored property 102 to the air duct 130. The air filter 128 is a porous device that may be used to remove impurities or solid particles from the air that passes through the air duct 130. The blower 132 is a mechanical device that can create a current of air, such as with the use of a fan. The thermostat module 136 is a device that may be used to receive commands from the thermostat 120 and convert the commands into instructions, may instruct the HVAC system 134 to move the temperature of monitored property 102 to a set temperature set by the thermostat 120. The heating module 138 may produce heat to provide to the monitored property 102. The evaporator coil 140 sits on top of the heating module 138 and may be used to cool air inside the monitored property 102. For example, the heating module 138 may warm the air provided by the blower 132 and may pass the warm air over the evaporator coil 140. The air provided by the heating module 138 may cool as it passes over the evaporator coil 140 because heat from the air transfers to the refrigerant in the refrigerant filled tubing 144. The refrigerant filled tubing 144 may circulate refrigerant between the outdoor compressor 146 and the evaporator coil 140. The air conditioner 147 may remove heat from the refrigerant, may supply air or other gas at increased pressure for the HVAC system 134, and uses a fan to create a current of air. The air-handling unit 142 includes a device that may condition and circulate air as part of heating, ventilating, and air-conditioning the HVAC system 134. The supply air grills 148A and 148B may provide resultant air from the HVAC system 134 to particular rooms in the monitored property 102.

Additionally, the components within the monitored property 102 may include one or more speakers 108, one or more cameras 110, one or more lights 112, one or more sensors 114, and one or more home devices 116. The one or more cameras 110 may include video cameras that are located at the exterior of the monitored property 102 near the front door 118, as well as located at the interior of the monitored property 102 near the front door 118. For example, a video camera may be placed in the basement of the monitored property 102 for visually monitoring the HVAC system 134 and send the images or video to the control unit 104 to send to a mobile device 156 owned by the owner 124.

The one or more sensors 114 may include a motion sensor located at the exterior of the monitored property 102, a front door sensor that is a contact sensor positioned at the front door 118, a pressure sensor that receives button presses at a light device, an air flow sensor included in the air duct 130 or the air-handling unit 142, and a lock sensor that is positioned at the front door 118 and each window. The contact sensor may sense whether the front door 118 or the windows is in an open position or a closed position. The lock sensor may sense whether the front door 118 and each window is in an unlocked position or a locked position. The airflow sensor may sense whether air is flowing through the HVAC system 134 when turned on to either heat or cool the monitored property 102.

The one or more home devices 116 may include home appliances such as a washing machine, a dryer, a dishwasher, an oven, a stove, a microwave, and a laptop, to name a few examples. The one or more home devices 116 may also include a humidity sensor that monitors for humidity effectiveness in each room of the monitored property 102. The control unit 104 can adjust how much sun light is let in to the monitored property 102 by adjusting a movement of shades covering each of the windows in the monitored property 102. Additionally, if the monitored property 102 is a commercial facility, the one or more home devices 116 may include a printer, a copier, a vending machine, and a fax machine to name a few examples.

The control unit 104 communicates over a wired or wireless connection over network 106 with connected devices such as each of the one or more speakers 108, one or more cameras 110, one or more lights 112, one or more home devices 116 (washing machine, a dryer, a dishwasher, an oven, a stove, a microwave, a laptop, etc.), and one or more sensors 114 to receive sensor data descriptive of events detected by the one or more speakers 108, the one or more cameras 110, the one or more lights 112, and the one or more home devices 116 in the monitored property 102. In some implementations, the connected devices may connect via Wi-Fi, Bluetooth, or any other protocol used to communicate over network 106 to the control unit 104. Additionally, the devices in the monitored property 102 can communicate over a long-range wired or wireless connection with a control unit 104 external to the monitored property 102. The control unit 104 can be located remotely from the monitored property. The control unit 104 can communicate bi-directionally with the devices in the monitored property 102 over the long-range wired or wireless connection. Specifically, the control unit 104 can receive sensor data descriptive of events detected by the sensors included in the monitored property 102. Additionally, the control unit 104 can transmit instructions to the devices in the monitored property 102 for particular events.

In some implementations, the control unit 104 can store the data received from each of the one or more speakers 108, one or more cameras 110, one or more lights 112, one or more home devices 116, and one or more sensors 114 to receive sensor data descriptive of events detected by the one or more speakers 108, the one or more cameras 110, the one or more lights 112, and the one or more home devices 116. Additionally, the control unit 104 may receive and store thermostat information from the thermostat 120. For example, the thermostat information may comprise a current temperature, an operating state of the thermostat, information based on changes of operating state of the thermostat such as when the thermostat is instructed to turn on and turn off, set points of the thermostat indicating target temperature, as well as outdoor temperature, and whether auxiliary heat is included in the household. Additionally, the thermostat information may include energy information associated with the HVAC system 134, a power usage associated with the HVAC system 134, a humidity level of the monitored property 102, and various temperature readings from around the monitored property 102.

In some implementations, the control unit 104 may obtain global presence data from the monitored property 102. The global presence data can be fed into and train a global presence model stored and implemented by the control unit 104. The global presence model may be used to predict who is currently located at the monitored property 102. The prediction can be made for not only humans but pets as well. The data required to train and implement the global presence model can include panel arming data, data from motion sensors, contact sensors, geolocation data (provided from a connected vehicle to the network 106 of the monitored property 102 or a mobile application connected to the network 106. Additionally, the data can include water usage in the home and can also be created by video analytics, which can indicate whether one or more persons or animals are found on the monitored property 102.

The control unit 104 can also create a device control model the monitors each of the one or more devices found in the monitored property 102. The device control model can be trained and implemented based on data from a thermostat control, such as a thermostat schedule, thermostat set point changes, and thermostat rules execution. Additionally, the device control model can be trained and implemented using light control data, lock control data (indicating user code schedules, entries, and exits), as well as shade/shutter state on the windows.

In some implementations, the control unit 104 can create various models for other monitoring and predicting of device usage in the monitored property 102. For example, the control unit 104 may generate an HVAC specific model that is trained and implemented based on outdoor temperature, thermostat temperature, remote temperature sensor readings, humidity (indoor and outdoor readings), detected wiring data and installer input to determine the HVAC type. The HVAC type can indicate, for example, a heat pump, boiler-based radiant heating systems, a furnace, and how many heating stages, to name a few examples. Additionally, the HVAC specific model can also be trained and implemented based on thermostat run times and resulting temperature changes.

Other models can include electric use data, which is modeled based on solar power generational data, electric usage in the home (entire home or plug level), and an electric vehicle charger state and power drawn from the electric vehicle. This can also include for example, Wi-Fi devices, detected, Bluetooth devices detected, calendars of residents, historical data corresponding to each of the aforementioned data, and electrical rate information. The electrical rate information can include base rates, TOU periods and charges, peak charges, real time price variability inputs, and data associated with utility bill extracted via user input and/or image recognition.

In some implementations, the control unit 104 can build a monitored property energy model. The control unit 104 can use input data to build this energy model. The energy model can be used to monitor thermodynamic energy storage in home air and/or water heater, demand for energy, and temperature of the home. In some implementations, the home energy model can include the use of an HVAC model, which monitors thermal storage in home air.

The HVAC model can, in some cases, predict a run time needed for the temperature in a monitored property to move from point A to point B over a period. For example, the HVAC model can indicate in an Arizona summer the minimum AC run time required to only allow the monitored property to move back from 75 F to 85 F (without going over) over the on-peak electric price period from 3:00 PM-8:00 PM. The prediction can rely on, for example, previous observed run time, temperatures (internal and external), and other data, such as, solar data, appliance usage, energy usage of each appliance, door/window openings, and other energy usage in the monitored property. The HVAC model can use tensor flow, Bayesian forest, a Proportional Integral Controller (PID controller), and neural nets, to name a few examples. One benefit of using a PID controller can include its ease of implementation and can more effectively prevent overshoot of temperature. In another example, the HVAC model may be able to indicate an expected rate of temperature change versus an actual temperature change, such as a heat coefficient confluence.

In addition to the HVAC model, the control unit 104 can generate and implement a hot water heater model. The hot water heater model can monitor thermal storage in a hot water tank. For example, the hot water heater model may be used to predict the run time required to achieve a set heat in the hot water tank.

In some implementations, the control unit 104 can train an electric vehicle model for the monitored property. In particular, the control unit 104 can train an electric vehicle model to predict charging time needed at night based on previous electric drawn data for charging and data required to charge the electric vehicle. The electric drawn data can indicate an amount of electricity required for the battery of the vehicle to be charged and additionally, a geolocation of the electric vehicle. Overtime, the electric vehicle model can be tuned and updated to re-assess the home battery charging time for the particular electric vehicle. Charging a battery of an electric vehicle effectively doubles the house's energy load. Those charging periods are generally scheduled for off-peak hours, but the control unit 104 can use the same energy-reduction tactics while charging electric vehicle batteries for customers with peak-demand tariffs during on-peak hours.

In some implementations, the control unit 104 can use the obtained data inputs to generate a model that can be used to predict residents' collective desires for the property. The control unit 104 can use global presence models as an input to create one more "comfort" models that may be sensitive to who is home and match their respective desires, for water temperature, air conditioning, and temperature of the property. One example of a comfort model can include an HVAC comfort model. An HVAC comfort model can heavily rely upon user specified set temperature points for home, sleep, away, vacation/traveling, and "energy aware" modes. Each of these sets points can include a range of acceptable temperatures (68-72 F) or a desired "ideal" temperature and a requested/required accuracy (70 F with a degree of error of 2 F). Additionally, each set point can optionally be tied to a specific temperature sensor, such as, in a bedroom, in the kitchen, and in the basement, to name a few examples. Additionally, the HVAC comfort model can also heavily rely upon global presence detection to determine if residents of the monitored property 102 are at home and awake, at home and asleep, or are away from the property.

The control unit 104 can generate a comfort hot water heater model. The comfort hot water heater model can be used to monitor a combination of: a hot water tank filling, a power draw, temperatures from a hot water tank thermostat, and additional information from a connected hot water heater itself overtime (in light of other relevant data points). In some examples, the comfort hot water heater can be used to predict future periods where hot water is likely to be needed and/or desired by residents of the property.

The control unit 104 can additionally generate an electric vehicle charger model and a lights model. The electric vehicle charger model can be very similar to the hot water heater model in that the electric vehicle charger model monitors energy draw from charging the electric vehicle, along with connected electric vehicle and location data to predict when energy may be needed to charge the electric vehicle in the future. The lights model can be based on historical usage paired with supporting data. In other implementations, the control unit 104 can generate other "comfort" models for the devices in the monitored property in a similar manner to those previously described.

In some implementations, the control unit 104 can also sense new devices that have entered the monitored property 102 based on Wi-Fi and/or Bluetooth sensitivity. The control unit 104 can set these devices to guest mode or on phone geolocation and no activity at the monitored property 102 for a while for vacation/travel mode.

The control unit 104 can also include an option to schedule a "dinner" or "cooking" window for systems with demand charges. In this type of window, pre-heating an oven or a stove can create significant electricity and power draw. To counter the effects of the power draw, the control unit 104 can offset the thermostat, water heater, and other devices in the monitored property to run less often during the pre-heating.

Through the combination of the relevant monitored property energy model and comfort/need model for various devices, the control unit 104 can optimize energy usage to maximize the homeowner comfort. For instance, the principles of execution may include energy optimization that is typically set to opt out mode for the resident of the monitored property, as the resident typically has full control to change settings of the energy and comfort models via the application of the mobile device 156 or by directly interacting with the alarm panel 122. In some instances, the resident, such as owner 124, can interact directly with the control unit 104 through a monitor and keyboard. Additionally, the control unit 104 can look for low cost windows to use energy that still meets comfort model requirements based on a particular energy model.

In some implementations, the energy model and comfort model of an HVAC system can work in tandem for various functions. One function includes minimizing the run time needed during peaking periods by using energy models to utilize full width of customers' "energy saver" set-points minimum just before high TOU rate and maximum temperature at end of high TOU rate by way of creating duty-cycles. Additionally, these models can set temperatures at certain times to prevent auxiliary heat from running and maximizing comfort depending on the system being modeled (e.g., HVAC).

During on-peak demand periods, the control unit 104 can set plans for cutting run time to save the residents cost. For example, cutting the run time between 15 different minute intervals can be extremely valuable or through duty cycling the HVAC system. For these types of plans, the control unit 104 can examine the loads of all the devices in the monitored property 102 (HVAC 134, water heater, electric vehicle, appliances at the monitored property 102, etc.) and determine if any of these devices need constant run time to meet comfort model predictions given energy model constraints. If this is not the case, then the control unit 104 can split up run times for each of these devices so that these devices do not all pull energy at the same time, causing a spike in energy requests. Ultimately, by splitting up run times, the control unit 104 can minimize the cost of a customer's energy bill. For some of the rate plans defined by the off-peak and on-peak plans, the control unit 104 can minimize disruption by only enforcing simultaneous run time restrictions when nearing the monthly peak thus far.

Customers can also become aware of buy-in changes made at their monitored property 102. For example, the control unit 104 can suggest and automatically create schedules and rules for energy usage (opt-in or opt-out schedules depending upon impact of changes and the control unit 104's level of confidence). In another example, the control unit 104 can suggest auto one-time changes with opt-out and even create invisible changes. The control unit 104 can also receive feedback from customers when customers change state of device from a schedule or a rule. This can include the notification to ask if this is a one-time opt-out or a preference for change to a rule or schedule. Additionally, the customer has the option to ignore the request for feedback. Likewise, the control unit 104 may choose not to send a notification for feedback in all cases but may make a change to rule/schedule regardless of receiving feedback. The control unit 104 can use these changes and request for feedback to enhance and improve the comfort model for each of the devices in the monitored property 102.

In some implementations, the control unit 104 can improve the temporary overrides to an HVAC systems' set point. Boost mode is known as the temporary overrides to an HVAC systems' set point. These boosts engage either additional heating or cooling on the system for a more limited amount of time. The idea is to automatically activate these boosts in a set of scenarios.

In some implementations, boost mode can be activated in a health/fitness tracker drive boost. Residents at the monitored property may commonly wear some sort of fitness tracker that tracks activity levels as well as commonly tracking specifically when customers choose to begin some sort of fitness activity. That activity level tracking may be in the form of heart rate tracking, step level tracking, or other sorts of activity tracking. When customers are determined to be active using one of the above data streams, we can infer that the customers are likely to be getting warm and correspondingly want to activate a cooling "boost" if the customers are either at home or going to be home soon. In some implementations, a passive infrared sensor can be included in a monitored property 102 to detect activity on a particular door or windows to indicate that a person is at home and active. The control unit 104 can determine if the customers are at home using techniques including detection of mobile device 156 on the monitored property's network 106 (such as Wi-Fi or Bluetooth network), detection of a Bluetooth device (many activity monitors have Bluetooth, so this is a particularly good option), and phone geolocation. The control unit 104 can also implement facial recognition on recorded video from the one or more cameras 110 at the monitored property 102. Geolocation may be a particularly good option for determining when residents are in proximity to the monitored property 102, but have not yet arrived at the monitored property 102. Otherwise, seeing that residents have left the monitored property 102 and their mobile device has remained at the monitored property 102 indicates they may not travel far.

In some implementations, boost mode can be activated in an appliance activity driven boost. When customers are performing some activities in the monitored property 102 involving appliances, customers are more likely to become warm. Some examples include: using a stove tends to warm people up; operating an oven tends to warm people up; to a lesser extent, the use of a vacuum cleaner at the monitored property 102 can warm up people; and, potentially, the use of a dryer, when removing a load of hot and freshly dried laundry for folding. Additionally, the control unit 104 can determine that activity using a variety of methods including energy monitoring on the devices on the monitored property 102; specific integration with the devices of the monitored property 102, which is becoming more commonly available for appliances; and, devices specifically tailored to monitoring the activity of those devices. This can be as simple as a sensor affixed to the appliance looking for a significant temperature change, or increased and sustained acceleration.

By implementing these various models across various monitored properties, the utility company may receive a variety of benefits. One benefit includes smoothing loads. In a particular geographic area, a set of monitored properties can have their runtimes offset so that the electric grid is not shocked by having many systems turn on and off at once. These models can mitigate the whip back at end of TOU or demand response programs effectively. The multi-account run time off setting can also be used by utilities in hotels, commercial buildings, and multi-family homes to minimize peak demand charges (this is much more common for large commercial customers). Even further, the ecosystem of monitored properties can each received adjustments to their energy models that adjust the run times more dynamically to counter for other load shifts that utility companies generally experience (given the ecosystem receives grid data from the utility company). Lastly, electrical vehicle clusters can help smooth out electrical load by offsetting electricity draws so that electricity is not requested for at the same time.

Another benefit for utility company includes providing energy sinks. Increasingly various areas including many monitored properties may include negative energy costs at nighttime. During nighttime when energy costs are negative, the ecosystem of monitored properties can run productive or unproductive energy sinks to improve the health of the electric grid. Specifically, this includes heating or cooling properties a few extra degrees, dehumidifying properties at nighttime, running a water heater program for energy sinking/smoothing, run auxiliary/emergency mode to heat a monitored property less efficiently, and charge one or more batteries at the monitored property.

In some implementations, the control unit 104 can also allow customers to opt into a few types of energy optimizing notifications. For example, these notifications can include notifications indicating bringing in outside air (due to opening windows) for a period of time that may decrease heating/cooling energy use for the day. The control unit 104 relies on internal and external temperature data, weather reports, air quality reports, and an internal energy model of the home to make these recommendations highly accurate. The notifications can also notify the customer if schedule requires heating and cooling in the same day based upon energy model of the home and anticipated weather forecast. In another example, the control unit 104 can use the comfort model to control lights, locks, and other devices at the monitored property 102 outside the energy model context.

In some implementations, the control unit 104 can use shade control to decrease HVAC demand. For example, the control unit 104 can obtain customer input on direction of shades and time of day to predict which may prevent direct sunlight. Additionally, automated shades can be incorporated into the mix to reduce the load on the HVAC system, either during peak periods or specifically when the customer is not home and swapping back to the previous settings when the customer returns to the "at home" state. This includes closing shades to boost A/C, and closing or opening shades (for directionally facing windows) to boost heating.

The control unit 104 can also check weather or solar generation data to predict direct sunlight. The control unit 104 can also override normal state to open or close of a property to promote a warmer or cooler home, as desired by the resident of the monitored property 102. The control unit 104 is more likely to override the normal operating state of the monitored property 102 when the global presence model predicts or detects that no one is home or during on-peak or off-peak rate hours. Alternatively, the control unit 104 can use combination of three models (global presence, energy model, and comfort model) to predict the need for stored energy. This can include data on severe weather and other islanding triggers. Various threshold-based rules can be used for real time prices to avoid the highest peaks.

In some implementations, the control unit 104 can implement a smart thermostat 120 with a smart scheduler. The smart scheduler can be used because customers (residents of monitored properties) do not set up schedules often enough, customers' schedules change regularly in most cases (such as in the case of one-off trips that may turn into cost savings or lack of comfort times), and can be used to minimize energy consumption. When minimizing energy consumption, the smart scheduler can recommend home improvements to the resident through the mobile device 156 or the alarm panel 122. For example, this can include build shade on windows for heat exchange, analyzing energy efficiency gain from being out of the sun versus temperature and assistance with humidity. Additionally, the smart scheduler can optimize timing of energy consumption through advanced rate plans and demand response (DR) integration. The smart scheduler can tie other data streams when seeking to optimize timing of energy consumption that includes utility input—in the case of DR and TOU plans; electrical data provided from solar panels; data provide large load controllers in the property, such as the water heater; electrical data from the electric vehicle charger; information from light switches indoors; internal humidity; external humidity; internal temperature; and, external temperature. Lastly, the smart scheduler can be used to ensure and optimize customer comfort at the monitored property 102 by, for example, anticipating when customers change state (away, at home, and asleep).

The smart scheduler of the control unit 104 can use the following inputs to meet the above goals for the customer. For example, the smart scheduler can take as input, security system arming state, motion sensor data, door and window contact data, granular and non-granular humidity data, detected Wi-Fi devices at the monitored property 102, detected Bluetooth devices at the monitored property 102, and state of the shade and shutters.

Additionally, the smart scheduler can monitor person detection and animal detection to set limits on temperature swing. Many residents at a monitored property may be willing to accept their pets being somewhat uncomfortable, but never accept anything that may put their pets in danger. Also, many residents do not always leave their pet(s) at home when they leave home. When pets are left at home, property owners typically avoid their property becoming dangerously warm or cold; however, they want savings when pets are not left at home. The control unit 104 may use a video analytics to determine when a pet is in the home and set the smart scheduler to away, then automatically correct to ensure the pet's safety. Another option may include leveraging a pet tracker to obtain this type of data, which may use Bluetooth for communicating. In another example, thermal systems of monitored properties can be slow systems, in that they do not change their temperature faster than 2 degrees F. per hour. This means sufficient enough time exists to detect a pet before the home enters a dangerous temperature range. In addition, if the smart scheduler knows who is at the home, the smart scheduler can access and maintain distinct HVAC profiles for each person. These distinct profiles may be different from each person in the monitored property 102.

In some implementations, the smart scheduler can additionally monitor historical knowledge of the aforementioned data (the inputs and the person and animal detection). This can also include data for motion history as well as temperature set points data.

In some implementations, the specific components of the smart schedules, and how the aforementioned data may be used can be combined with customer inputs to optimize their system. For example, the control unit 104 can train the smart scheduler to optimize an "at home" temperature mode, an "away" temperature mode, a "sleep" temperature mode, and a "vacation" temperature mode. Customers can also input what temperature sensor they desire to use with each of the settings above (for example, comparing the master bedroom temperature to the set point temperature when in "sleep" mode). Based on the differences between the different set point values, the control unit 104 can extract their preference for comfort (which is particularly based on the difference between their home and away set points). This is used to inform how aggressive the control unit 104 is in pursuing savings for the customer.

In some implementations, predictions about when customers are likely to be at home, away, and asleep can be determined based on a percent likelihood of being in each state. The control unit 104 can include and execute built-in hysteresis around the transitions. For example, in the current model, the control unit 104 can mark a point when a customer is expected to transition to being away as the point when their likelihood of being home drops under 40%, and the expected transition time to being home is when their expected likelihood of being home rises above 80%. These percentage likelihoods can be based primarily on arming and motion data at the monitored property. Additionally, the plan is to roll in more data sources to capture customers' current state accurately. Another source includes direct user input, where most likely users are prompted via a push notification when we think everyone has left home and then they can confirm that, contradict that, or take no action. Based on previous users, the control unit 104 can analyze not only the current activity patterns and the previous activity patterns by even capturing tasks not typically noticed by the customer, such as the day of the week where customers work late or come home early.

In some implementations, the smart scheduler can generate a gradual ramp towards comfortable home temperatures ahead of arrival at the monitored property 102. For example, historical data is used to determine when customers are likely to head home. The control unit 104 can then begin gradually adjusting the smart scheduler towards their "at home" temperature so that for average customers, the temperature may reach their home temperature just as they are expected to arrive at the monitored property.

In some implementations, for customers with heat pumps, the control unit 104 can maintain a difference between the set point or target temperature and the current temperature that is not high enough to kick on the auxiliary heating system. If the auxiliary heating system is turned on at the monitored property 102, energy savings can be quickly lost. Another option includes temporarily adjusting the differentials on the thermostat that determines when the auxiliary heat turns on, which is straightforward to do on the thermostats. Another factor includes for customers with a gas furnace, which can be determined based on thermostat settings, the control unit 104 may aim to have the home reach the target temperature after customers arrive home. For customers with heat pumps, the desired temperature of the monitored property may be set when they arrive home to avoid the fan running when the customer arrives at the monitored property. Additionally, when cooling a monitored property, it is fine to reach the desired temperature of the monitored property after the customer arrives home and having the fan blowing air decreases the temperature. For customers with a high preference for savings (large difference between home and away set points), the target temperature may be met after the customer was expected to arrive at home.

In some implementations, the smart scheduler can ramp towards the away temperature when customers are expected to leave the monitored property. These properties can be determined and set based on the expected timeframe when customers are expected to leave the monitored property. During the last period of time prior to the customer leaving, the control unit 104 can back off the current set temperature point towards the away set temperature point. How long before the customer leaves the monitored property to back off the current set temperature can be based on a "comfort parameter," which can vary based on historical analytics and user set values.

In some implementations, the smart scheduler can adjust ramping for the HVAC system power, the thermal envelope of the monitored property. In some cases, the control unit 104 can use fixed values for the expected heating/cooling power of a monitored property's HVAC system. In other cases, the control unit 104 can use more flexible parameters for the monitored property's heating power, cooling power, and insulation. Typically, the heating and cooling parameters are independent, though they may be closely linked in the case of heat pumps. The control unit 104 can use these parameters in conjunction with the temperature delta between the interior and exterior of the property to provide our expected heating/cooling rates as well as the associated time need to reach a desired "at home" temperature.

In some examples, the control unit 104 can use system identification with hidden markov models to build a mathematical representation of the behavior of the monitored property 102. System identification uses statistical methods to build mathematical models of dynamical systems from measured data. The inputs for the models can fall into two categories—general data inputs and inputs that can be controlled by the control unit 104. For example, the general data inputs can include an outdoor temperature, indoor temperature at each temperature sensor in the monitored property, external humidity, internal humidity, open/close status of doors and windows, and perceived number of people in the monitored property based on number of Wi-Fi devices in range, motion sensor activity, and other factors. The inputs that can be controlled by the control unit 104 can include the state of each relay driving a heating stage; the state of the relay driving the system's fan; and, the state of the relay driving the humidifier. For example, activity from a 24 volt thermostat can result in particular relays opening and closing and each relay's status can act as a 1 or a 0, which can be an input into a Hidden Markov model. The outputs can include the temperature(s) of the sensor(s) used for the monitored property's "at home," "away," "sleep," and "vacation" settings. Additionally, the outputs can include the run time of each heating/cooling stage, which the control unit 104 may prefer to be a relatively low value.

In some implementations, the control unit 104 can use the above input and output data for the monitored property 102, and then use that model to predict the effect of instructing the thermostat to act on various functions. Additionally, more control theory can be applied to drive the HVAC system given the local conditions (indoor/outdoor temperature) as well as target temperatures informed by the customer's activity pattern.

In some implementations, the control unit 104 can employ load-shifting techniques on the HVAC 134. For example, the load-shifting techniques can include pre-cooling and duty-cycle shifting to offset the customer's energy costs. Additionally, in some cases, furniture in the monitored property can act as thermal batteries. In some implementations, when pre-heating the HVAC 134, the control unit 104 can instruct a humidifier to run to increase the humidity in the monitored property. This may be beneficial because more humidity in the air holds temperature better. Additionally, this may create more heat in the air when the water transitions phases to a liquid.

In some implementations, the control unit 104 can monitor a connected electrical vehicle parked at the monitored property. If the control unit 104 is set to an "armed stay" security mode or an "armed sleep" security mode, the control unit 104 can assume the property owner of the monitored property 102 is not planning to leave the monitored property 102. In this case, the control unit 104 can detect whether an electric vehicle charger is hooked up to a plug at the monitored property (which can be turned on/off like a typical binary switch). In this case, the control unit 104 can defer charging until a point later in the night to improve the overall pricing for the customer.

In some implementations, the control unit 104 can implement a peak protect module. The peak protect module is a control product comprising of software and hardware for thermostats and heavy-duty smart switches (HDSS) that aids customers adapt to Time-of-use (TOU) and TOU plus demand electricity rate plans. These plans are primarily offered in the Southwestern portions of the USA and in other countries with extreme summer temperatures. As of 2021, all customers located in California and Arizona may be defaulted to TOU rate plans unless these customers are grandfathered into an older rate plan (usually linked to solar installation).

The peak protect module implemented by the control unit 104 helps customers save money by shifting their electrical load from expensive on-peak times to cheaper off-peak times. This also manages energy consumption during each billing period (usually 30 or 60 minutes) to optimize for TOU plus demand rate plans like Saver Choice Max from APS in Arizona. Many utilities may offer guidance on how to adapt to TOU rate plans, but this guidance is based on existing thermostat technology and advocates for a crude method that does not work well for TOU plus demand customers. The advice generally tells customers to set their thermostat 2-3 degrees below their desired set point 2-3 hours before the on-peak period starts, and then to set their thermostat 3-4 degrees above their desired set point during on-peak hours. This works adequately for customers on 3-hour TOU-only rate plans as the duration of the on-peak period is short and there is no penalty for using more electricity in one on-peak period than another, but the method breaks down for longer on-peak periods and is not very beneficial for customers on TOU plus demand rate plans for a variety of reasons.

One reason this is not beneficial for customers on TOU plus demand rate plans includes making a 2-3 degree F. set point change during mid-day (on-peak usually starts between 2:00 PM and 5:00 PM) that is inefficient. This is inefficient because the outdoor temperature is near its maximum and making such a set point change results in extended on-cycles of the A/C unit, which is also inefficient and can be uncomfortable. Another reason includes on hot days, 2-3 hours may not be enough to cool the monitored property to the target set point, so the house hits the on-peak set point quicker during the on-peak hours, costing the customer more money. A third reason includes this method results in extended periods of AC off-time that can be uncomfortable and can lead to large temperature differences within the house due to a lack of air mixing. This lack of air mixing is an issue when the first on-peak AC cycle starts because the average air temperature is actually higher than the set-point temperature and it can result in a very long first cycle during on-peak hours which is bad for TOU plus demand customers and can cause a large "whip-back effect" on the grid towards the end of the on-peak period. Another issue includes the offered advice from utilities does not account for individual differences in building construction, shade on the house, outdoor temperature, air conditioning sizing, etc., so an adaptive cooling scheme is much more effective than generalized advice. Lastly, the method can result in larger variances in electricity bills since hotter days may result in significantly more on-peak A/C runtime than on cool days.

The peak protect module can address each of these issues in the following ways. For instance, the peak protect module uses a "gradual pre-cool" method that starts during the cooler morning hours and has periods of air conditioner off-time built in to allow the air conditioner compressor to cool off and operate more efficiently. It can also be more comfortable since there are not extended periods of A/C on-time. Additionally, this method is more adaptive on hot days since it has time to get ahead of the heat on extreme temperature days. The gradual pre-cool method also reduces strain on the grid since not all customers are pre-cooling at 100% at the same time immediately prior to the on-peak period. This helps utilities deal with ramp-related issues around the transition times from off-peak to on-peak periods.

The peak protect module also pre-schedules intermittent cooling cycles during on-peak hours. This is extremely beneficial to TOU plus demand customers as this ensures that the A/C related energy usage is the same during every on-peak billing period. It is also good practice in general as the peak protect module reduces the whip-back seen at the end of on-peak periods with the typical thermostat control method. The peak protect module also prevents stratification of the air in the house and provides relief to occupants through the on-peak time. The peak protect module schedules the on-time based on the outdoor high temperature forecast and the thermal model that it has built of the house, so the peak protect module is much better than the one-size-fits-all method that utilities typically recommend. The peak protect module may also look at the rate of temperature rise inside the house and may truncate or skip an A/C on-cycle if a full A/C on-cycle is not required to maintain an adequate temperature rise rate. This helps create a consistent temperature experience even if the outdoor forecast is inaccurate or there are other aspects of the home that are different than on precious days (i.e., window shades are open, internal doors, are closed, cooking is happening, windows left open, etc.).

Since the peak protect module can schedule A/C on-times in hourly or half-hourly intervals, customers may find the operation highly predictable, so they are less likely to intervene early and lower their set point because they are feeling too hot. In some implementations, the peak protect module can schedule A/C on-time to be other time intervals. For example, the peak protect module can schedule the A/C on-time to be 10 minutes, 15 minutes, and 20 minutes time intervals. Intervening early during on-peak times is common with the utility-suggested method. The synchronous cooling method also allows for more accurate thermal modeling and allows for the advanced use of control theory in the A/C on-time control algorithm. In other examples, the duty-cycle can correspond to an 8-minute on-time or other periods. For an on-peak period of 3:00 PM to 5:00 PM with 8-minute on-times, the HVAC 134 will be on from 3:00 PM to 3:08

PM, off from 3:08 to 3:29 PM, on from 3:30 PM to 3:38 PM, off from 3:39 PM to 3:59 PM, on from 4:00 PM to 4:08 PM, off from 4:08 PM to 4:29 PM, on from 4:30 PM to 4:38 PM, and off from 4:39 PM to 4:59 PM.

In one example of the peak protect model, a customer requires 10 kilowatts of cooling from 3:00 PM-8:00 PM to remain comfortable. Rather than allowing the temperature of the monitored property 102 to rise to 75 F, which may require heavy cooling, this may be heavy demand on the utility because of the extra capacity utilized at the beginning of the on-peak period when everybody turned off their A/C and everyone sets their thermostat higher. However, as the solar energy declines on at 6:00 PM, residents begin to ramp down on solar energy and ramp up on other electricity sources. Then, if residents' air conditioning comes online at the same time, this parallel draw in electric power may crash the electric grid. Instead, the peak protect module recommends using a certain number of minutes per billing period, such as A/C on, because then the electric utility can treat this as a firm load.

Electric utility companies may know that the cohort of properties may use the exact same amount of electricity during the full duration of the on-peak period, as having to do what most people have to do due to the constraints of a thermostat. A thermostat can only maintain a static temperature, which is either off or on for an extended period. Pre-cooling the temperature before the on-peak may make electrical usage asymmetric during on-peak and thus, spreads out the electrical usage and makes it more symmetrical across the entire on-peak period. Thus, the peak protect module can control the duty-cycle of the thermostat 120. For example, the peak protect module may instruct the thermostat to not be on more than 60% of the time during on-peak hours, and even have finer granularity.

The idea of the peak protect module is to minimize the period of greatest usage of total amount of energy used, called load spreading. Load spreading may include a way to minimize the highest energy usage during a period, such as during the on-peak period. For example, as illustrated in plot 150, the on-peak period lasts from 3:00 PM to 5:00 PM. From 3:00 PM to 4:00 PM, the temperature may remain 77 F. From 4:00 PM to 5:00 PM, the HVAC 134 turns on and drops the temperature from 77 F to 74 F. As 77 F is the highest temperature during the on-peak hours, the customer may pay a high demand cost during this on-peak electricity. The peak protect module may seek to offset the customer's costs during the on-peak period by adjusting the duty-cycle of the on-peak period. As shown at 151, the peak protect module may reduce the duty-cycle from the on-peak demand from 100% to a 50% duty-cycle. The resultant plot shown in plot 154 may split the amount of time the HVAC 134 remains on into 30-minute increments. For example, instead of having the HVAC 134 on from 4:00 PM to 5:00 PM, with a 50% duty-cycle, the HVAC 134 may remain on from 3:00 PM to 3:30 PM (50% of the hour from 3:00 PM to 4:00 PM) and is then off from 3:30 PM to 4:00 PM. From 3:30 PM to 4:00 PM, the temperature slightly rises as the HVAC 134 has turned off. Then, the HVAC 134 may turn back on from 4:00 PM to 4:30 PM (50% of the hour from 4:00 PM to 5:00 PM). From 4:30 PM to 5:00 PM, the HVAC is off and the ultimate desired temperature of 74 F is reached. In some implementations, other duty-cycles may be used to adjust the amount of time the HVAC 134 remains on. In some implementations, these duty-cycles may be staggered across a large population of customers to ensure each HVAC turns on at different times. In some implementations, the control unit 104 may instruct the HVAC 134 to perform pre-cooling before the on-peak hours.

In another implementation, the peak protect module allows users to optimize an on-peak period for greatest electricity usage efficiency. In this case, if the A/C is run for long periods of time, the compressor may grow hotter and hotter, which may ultimately reduce the efficiency of the A/C. Allowing the compressor to cool down between cycles, as long as the HVAC is not short cycled much, improves the overall efficiency of the system. Therefore, by having direct control of the duty-cycle, the optimal time the HVAC 134 remains on can be determined.

Figure 2A:
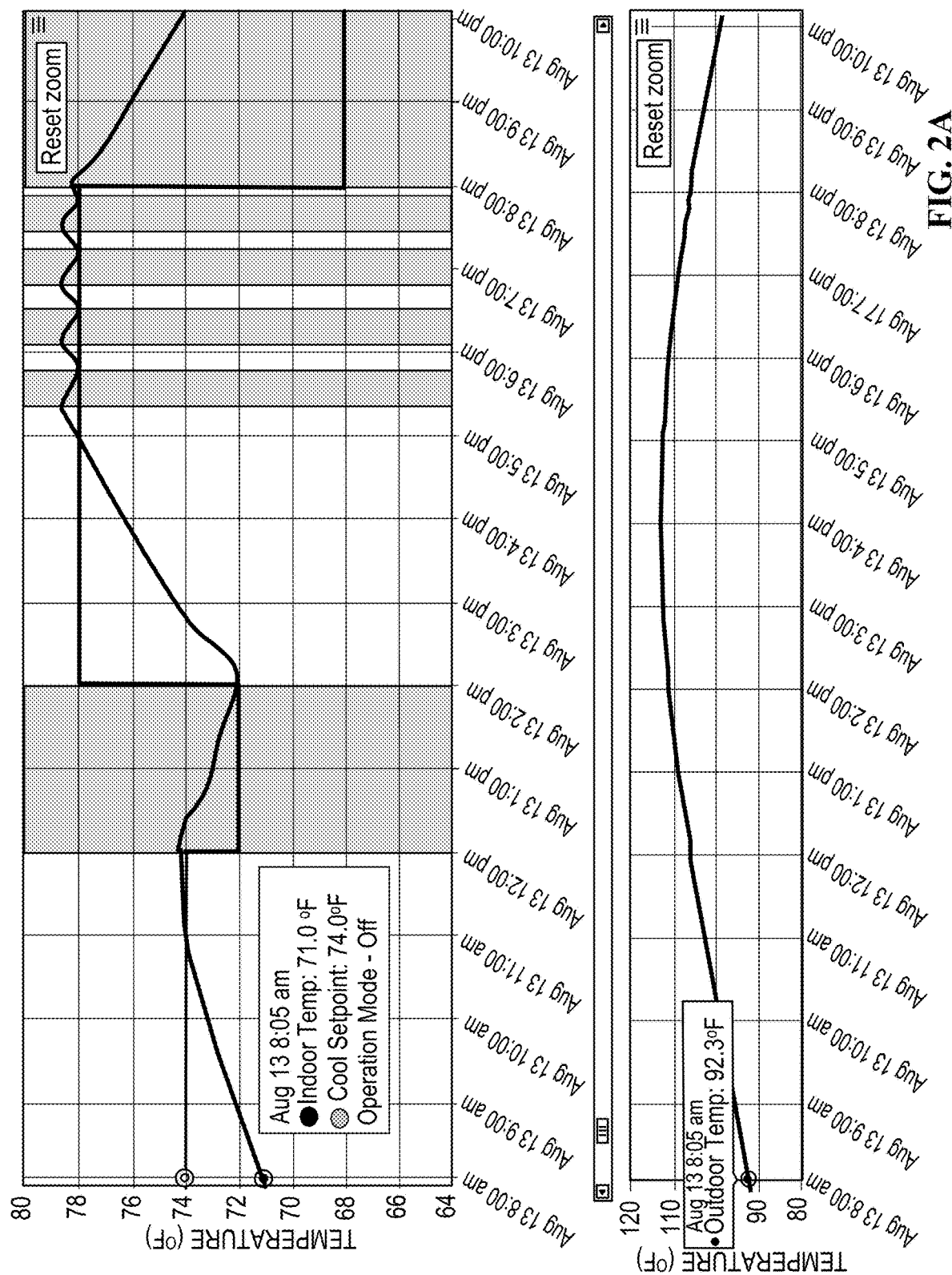
FIGS. 2A through 2F illustrate example diagrams of a temperature versus time plots at a monitored property.

FIG. 2A illustrates an example diagram of a temperature versus time plot at a monitored property. In some implementations, the peak protect module can be offered as a complementary service to demand response events. Often TOU plus demand can be viewed as an alternative solution to traditional demand response products. Additionally, the peak protect module can actually help make demand response more effective in certain cases when the customer may have been using an aggressive pre-cool and on-peak temperature back-off. FIG. 2A shows an exemplary customer's cooling scheme prior to the peak protect module being implemented without demand response. This plot is produced from an upstairs portion of the monitored property.

Figure 2B:
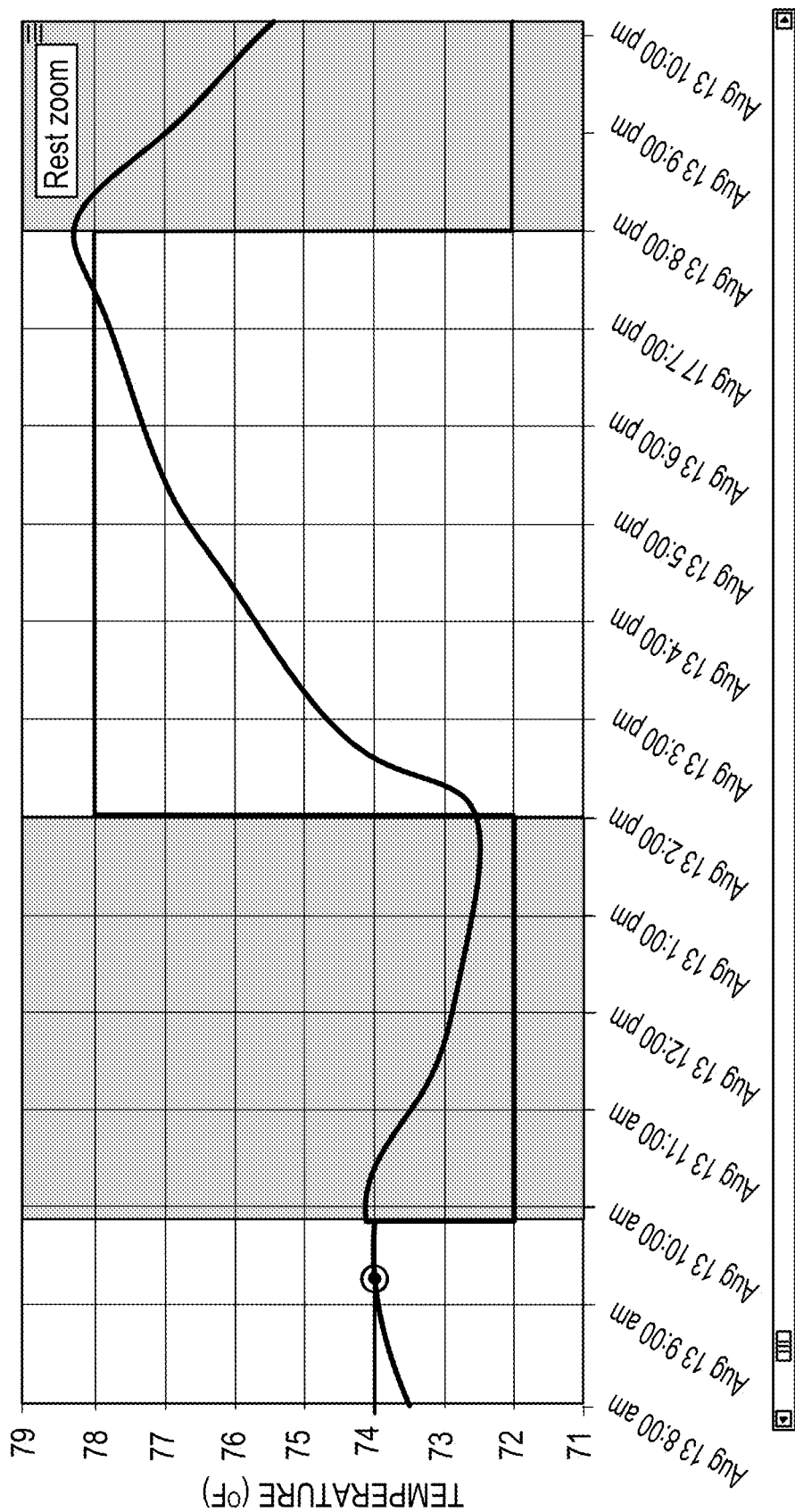

FIG. 2B illustrates another example diagram of a temperature versus time plot at a monitored property. FIG. 2B is similar to FIG. 2A, in that it shows an exemplary customer's cooling scheme prior to the peak protect module being implemented without demand response. However, the plot of FIG. 2B is produced from a downstairs portion of the monitored property.

Figure 2C:
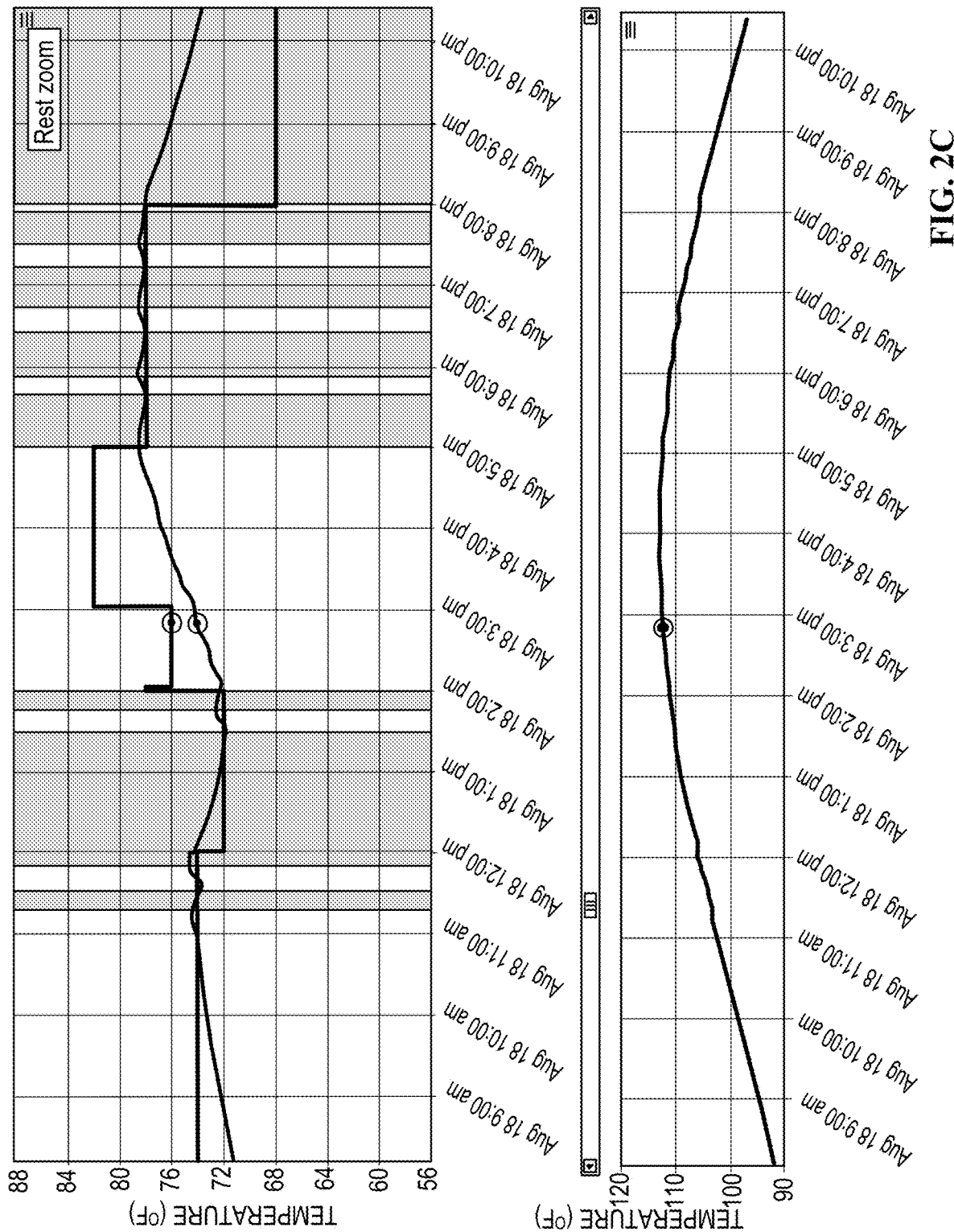

FIG. 2C illustrates another example diagram of a temperature versus time plot at a monitored property. FIG. 2C shows an exemplary customers cooling scheme prior to the peak protect module being implemented with demand response. This plot is produced from an upstairs portion of the monitored property.

Figure 2D:
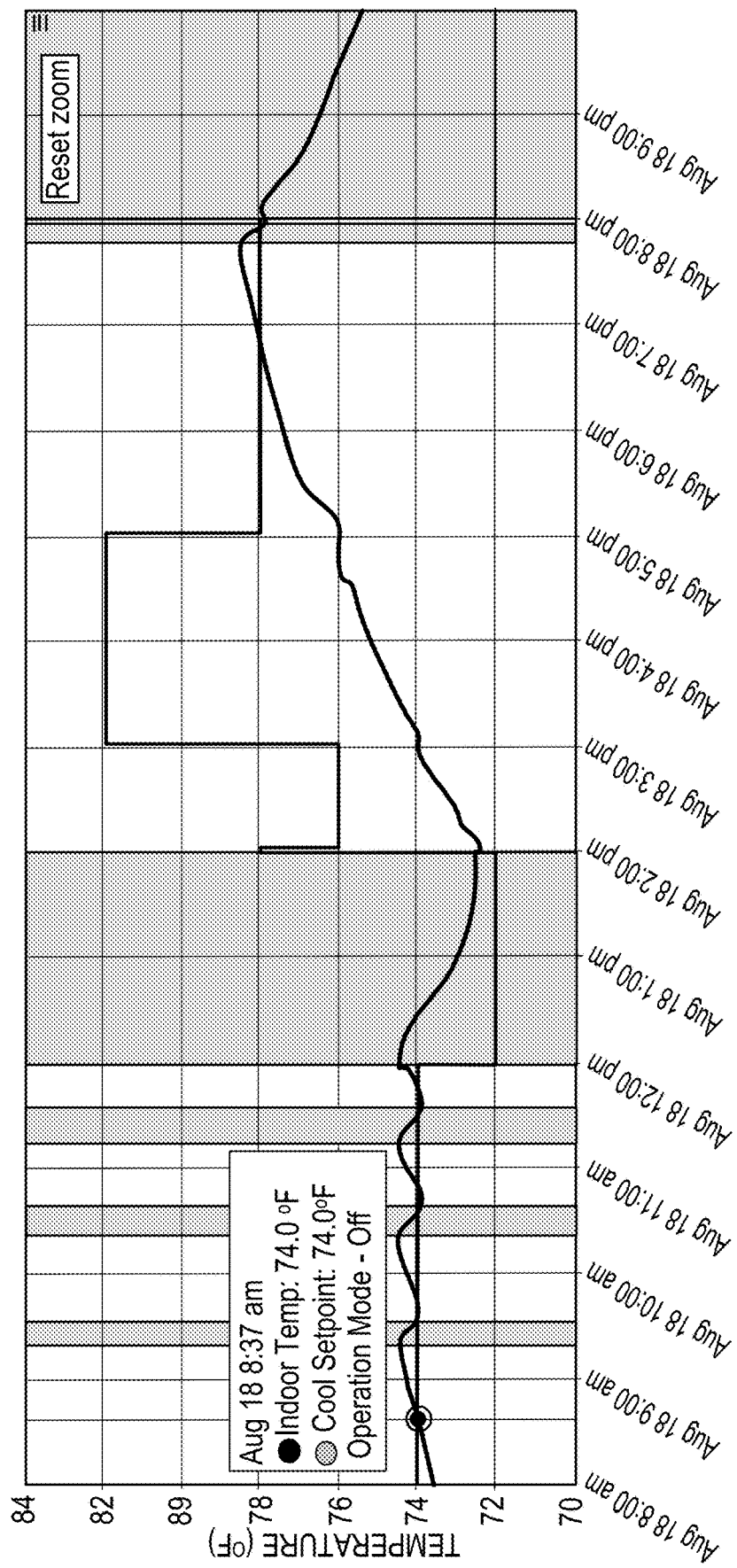

FIG. 2D illustrates another example diagram of a temperature versus time plot at a monitored property. FIG. 2D is similar to FIG. 2C, in that it shows an exemplary customer's cooling scheme prior to the peak protect module being implemented with demand response. However, the plot of FIG. 2D is produced from a downstairs portion of the monitored property. As shown from FIG. 2D, due to the aggressive nature of the cooling schedule, this monitored property is providing almost no benefit to the utility during the 3:00 PM-5:00 PM demand response event because the A/C on-time during that time is 0 minutes.

Figure 2E:
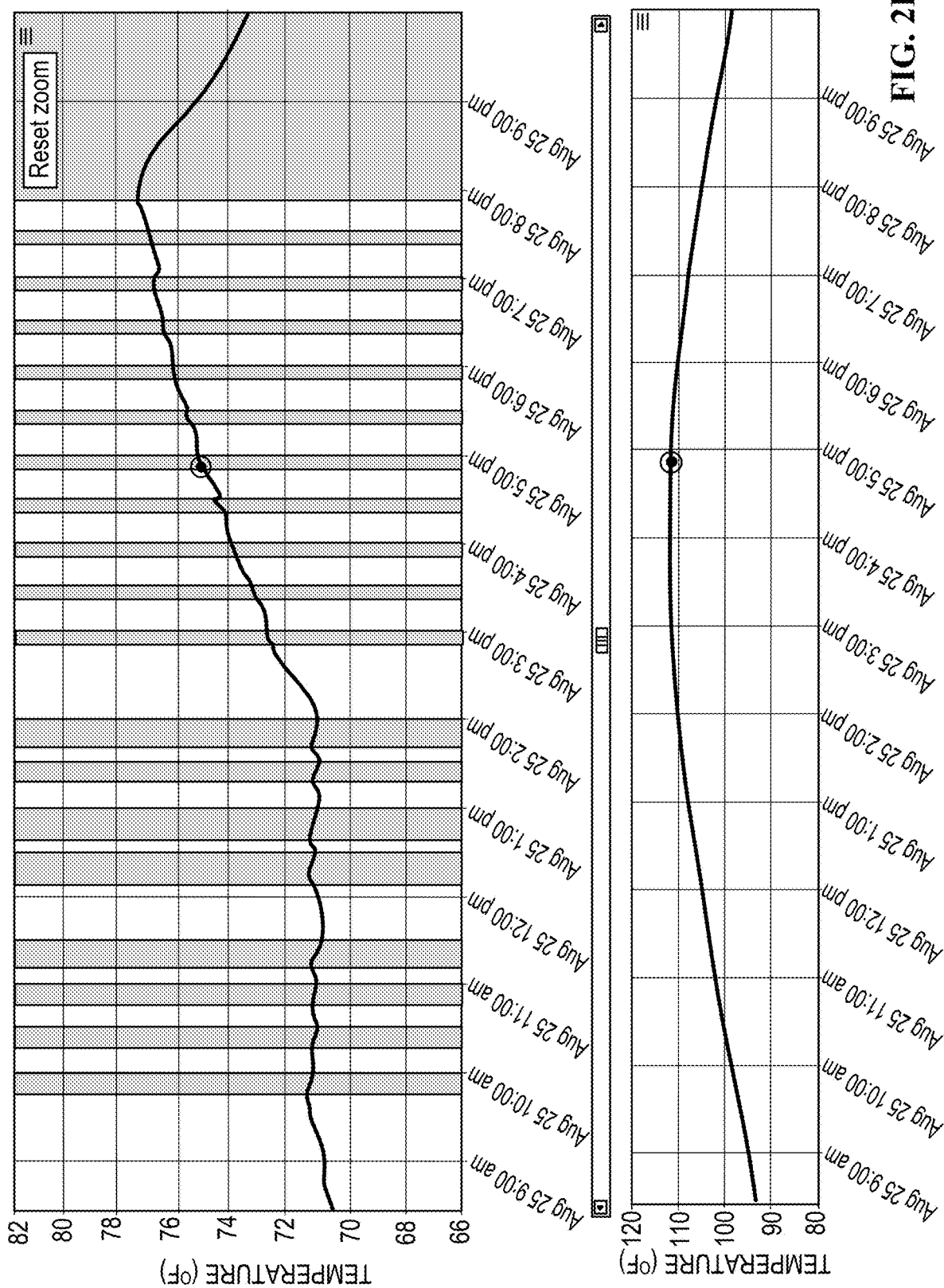

FIG. 2E illustrates another example diagram of a temperature versus time plot at a monitored property. FIG. 2E shows an exemplary customers cooling scheme with the peak protect module implemented but without demand response. This plot is produced from an upstairs portion of the monitored property.

Figure 2F:
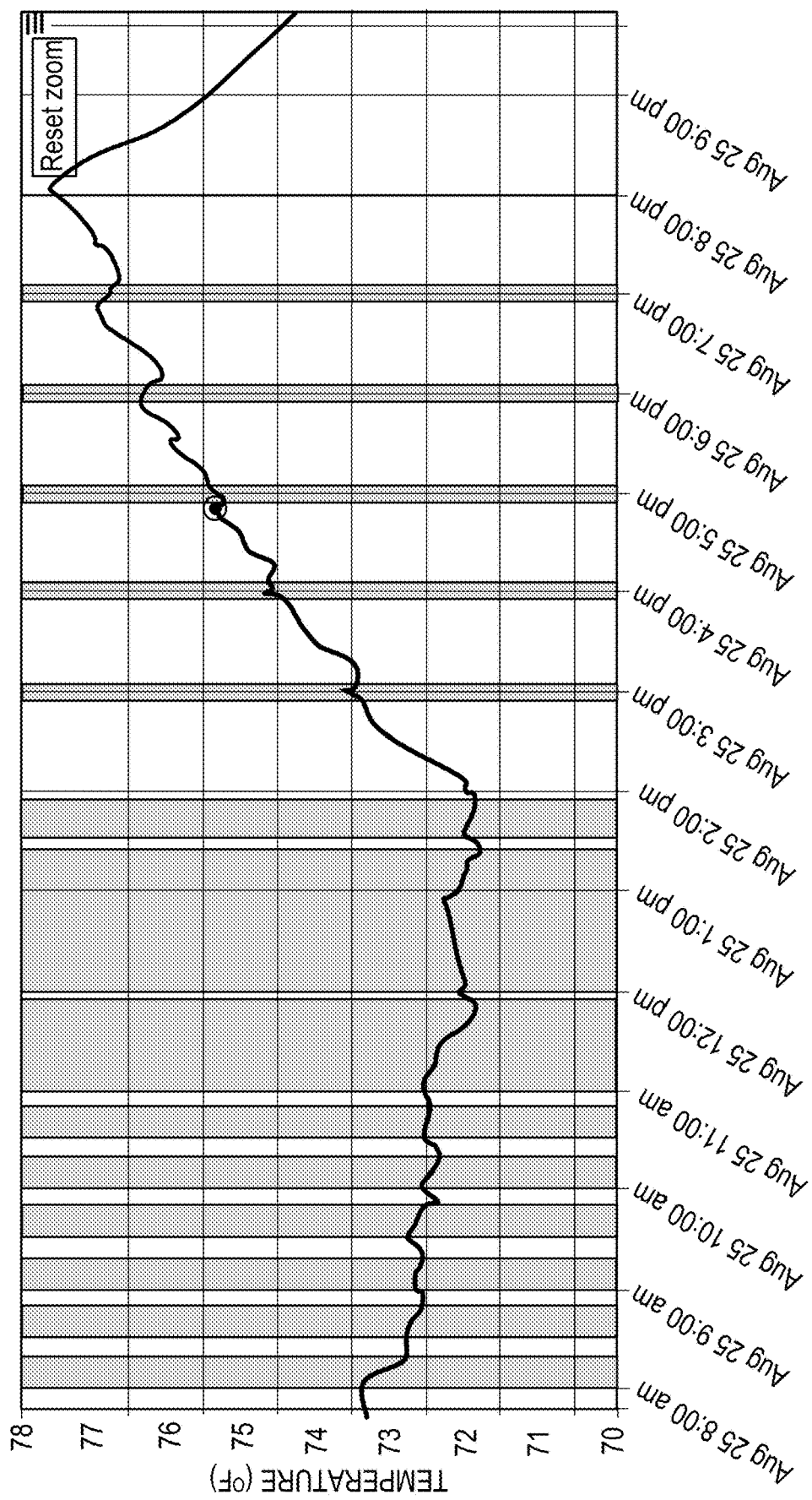

FIG. 2F illustrates another example diagram of a temperature versus time plot at a monitored property. FIG. 2F is similar to FIG. 2E, in that it shows an exemplary customer's cooling scheme with the peak protect module implemented without demand response. However, the plot of FIG. 2F is produced from a downstairs portion of the monitored property. Additionally, FIG. 2F illustrates that with the peak protect module, the intermittent cooling throughout the on-peak period (2:00 PM-8:00 PM) creates a predictable market for a 3:00 PM-5:00 PM demand response event. If demand response is implemented in conjunction with the peak protect module, the reduction in load may be non-zero and highly predictable since the exact expected A/C on-time during that window was known ahead of time. In this way, the peak protect module adds value to traditional demand response, rather than competing with the demand response.

Figure 3:
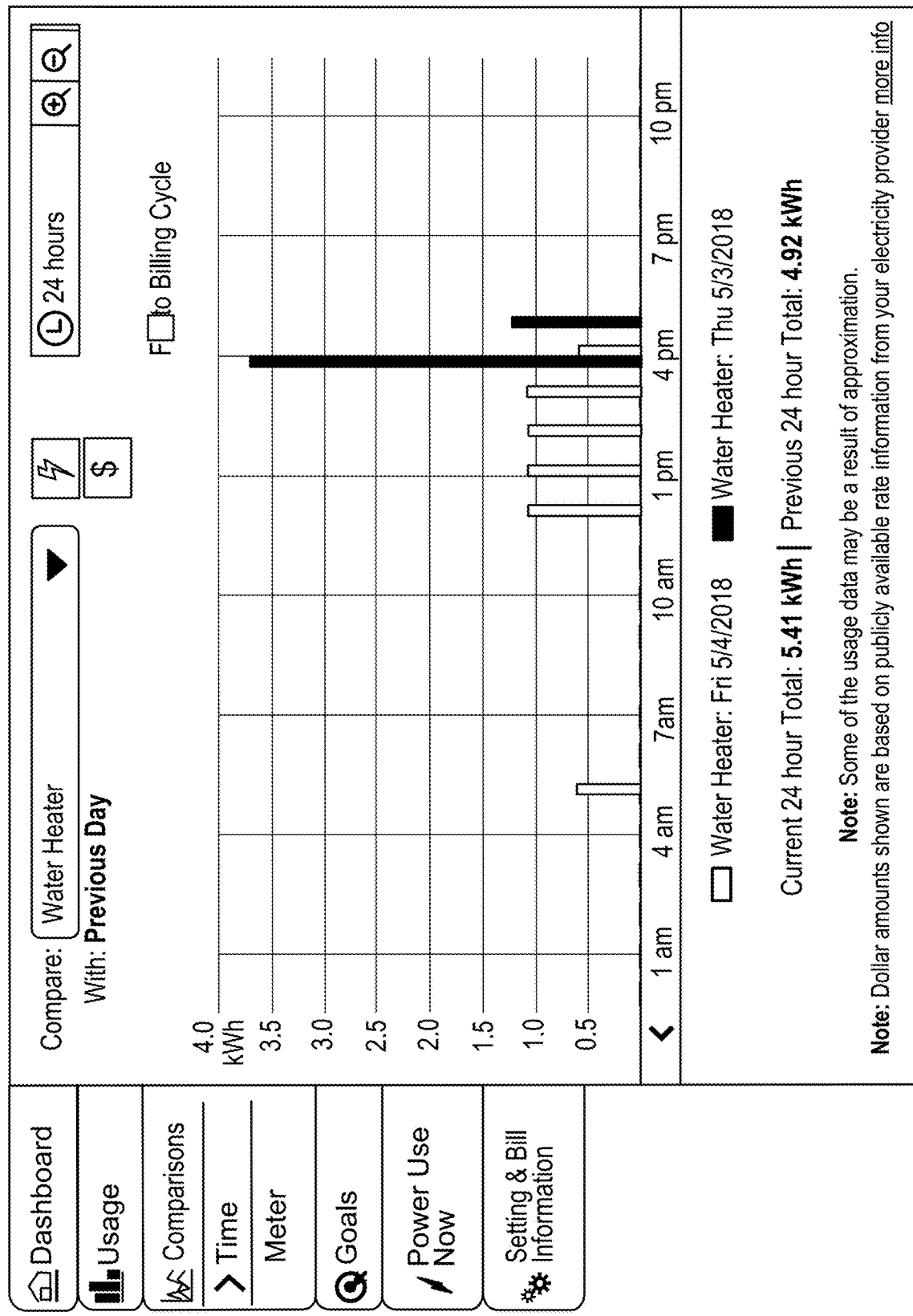
FIG. 3 is a contextual diagram of the smart scheduling system monitoring hot water usage during on-peak times.

FIG. 3 is a contextual diagram of the smart scheduling system monitoring hot water usage during on-peak times. In some implementations, the peak protect module can work with heavy-duty smart switches to duty-cycle large loads during on-peak hours in order to limit power consumption during any one billing period. Typically, this is performed with hot water heaters. If a customer uses hot water during on-peak times, the hot water heater may try to heat up all the incoming cold water immediately, but the peak protect module slows down the reheat process as a reduced recover rate. This can visualized in the contextual diagram of FIG. 3. The smaller and larger readings on the diagram indicate hot water heating events (for consecutive days) were a result of draining 40 gallons of water out of the hot tap. The smaller readings (less than 1.1 kWh) indicates a 25% recover rate, while the larger readings (greater than 1.1 kWh) shows no recovery rate adjustment.

In some implementations, the peak protect module can work in conjunction with an "appliance awareness device" or AAD. The appliance awareness device may be a module located in the control unit that detects when large appliances are turned on and off in a non-invasive manner, such as over the power cable. This type of device can be used to further inform the HVAC and the heavy-duty smart switches behaviors of the peak protect module. For example, if the AAD is used on an electric range, and the device detects usage during on-peak hours, the AAD can relay that information to the back end and the back end can send a message to adjust or over-ride the scheduled A/C on-time for that billing period so that customers on the TOU plus demand rate plans not get charged a costly demand charge. For each appliance awareness device event, an offsetting action can be prescribed and implemented in order to keep the demand component of the users' bill in check.

In some implementations, the peak protect module can be interacted with via a user interface. In lieu of (or in addition to) a metering device that can change the peak protect algorithm schedule in real time, the peak protect module can be interfaced with a customer facing user-interface feature that allows users to set a "dinner window" as part of their schedule on a client device. In one example, pre-heating an oven can dramatically increase the demand charge (kW charge) or a customer by adding a large load on top of the regularly-scheduled HVAC on-time. If a customer knows that they may be pre-heating their oven every weekday sometime between 5:00 PM and 6:00 PM, the customer may interact with the user interface on their client device and the algorithm may adjust the scheduled duty-cycle accordingly during that window to account for the additional electricity usage. For example, a customer sets a "dinner window" from 5:00 PM-6:00 PM and the peak protect module gets adjusted 3:00 PM-8:00 PM at 30% on time to a different on time. The different on time can include 3:00 PM-5:00 PM at 35% on time, 5:00 PM-6:00 PM at 10% on time, and 6:00 PM-8:00 PM at 35% on time. In some implementations, the actual percentage drop of the duty during the window may be set by the customer or may be defaulted to a pre-determined value.

In some implementations, the peak protect module can determine the duty-cycle based on a pre-determined value or a learned value over time. The learned value can be based on size of the monitored property, the amount of airflow, and outdoor temperature. The peak protect module can receive feedback from a certain duty-cycle when target temperature is not precisely hit. For example, the peak protect module may select a minimum and maximum temperature and try to hit the minimum temperature during pre-cool during the on-peak period. Then, the peak protect module tries to stay a degree below the maximum temperature, as a target, and a duty-cycle value is iteratively selected to see how close the maximum temperature can be met. The peak protect module can also include a temperature feedback loop where the forecasting high temperature for the day was obtained and the duty-cycle adjusted based on that.

The peak protect module can also implement set-point toggling. Set-point toggling changes the set point to force the air conditioner into one of various modes. The set point can be stepped up or stepped down such that if the system is overcooling, the peak protect module may skip a cycle if cooling is keeping temperature lower than the target cooler temperature. Additionally, the peak protect module may have a truncated cycle or a skipped cycle, as an effective failsafe.

In some implementations, the peak protect module can incorporate abstract modes from customer views. The abstract modes can have target temperatures and a setting for accuracy (and even a minor visible setting to say proximity to target temperature of 2, 3, or 4 degrees F.). Additionally, the peak protect module can have set point temperature changes that are temporary and can include a learning artificial intelligence (AI) mode. In the AI mode, the peak protect module can build a model of preference based on all other inputs at time of temperature shift. The peak protect module can provide a push notification to the resident a time of setback, such as, for example "Why did you change the temperature?" The resident can provide responses such as—(1) "The room I am located in has a different temperature from the rest of the house", (2) "I wish the temperature was higher/lower at this time", (3) "I have unusual circumstances that make a higher/lower temperature", and (4) "I desire the temperature to be XXX at this time."

In some implementations, the peak protect module can run in an energy saver or money saver mode during a demand response event. This may be used to discourage changes during those periods. The results can be displayed on an alarm panel or the thermostat.

The peak protect module can obtain data from all other devices (motion sensors, contact sensors, use of applications, HVAC, etc.) to define the global presence or home state. The other states can include being at home, away from home, or sleeping, to name a few example. The obtained data can also be used to dynamically create "schedules" depending on current expected state. Also, the obtained data can be used to build a sophisticated model of the monitored property.

The peak protect module can obtain calendar information and health data. For example, by knowing a house party is imminent, the peak protect module can pre-cool the monitored property. In another example, the peak protect module can provide heat to residents for carpal tunnel during work. In another example, the peak protect module can humidify the monitored property to aid in preventing cold and flu-like symptoms while others are visiting.

By implementing a peak protect module, multiple benefits may be offered to the utility company and the customer. The customer may have gained comfort in his or her own home and bill minimization. The utility company may have demand response events, "whip back" sharp changes at beginning and end of TOU can be prevented. The peak protect module can collect data about how insulated a home to stagger with no downside to homeowners. Additionally, for utility companies, the peak protect module can be provided as a cohesive offering with the demand response programs more directly. Customers can also achieve some incentives, such as a piece of the utility company benefits. Additionally, the peak protect module can be used as a virtual power plant—bidding in day-ahead markets.

In some implementations, the peak protect module may be implemented in a hotel environment. The peak protect module may also be implemented in a single billed apartment environment, where peak consumption is limited by offsetting HVAC kick-on to irregular schedules. This can be tied together with remote room let-in and HDSS and other metering data to also have HVAC compensate for other heavy loads they may have (pool pump, etc.). This may allow customers to prevent high demand charges across their property and is a fast way to monetize the thermostat collective decision. In some implementations, a central unit system monitoring various hotels, apartments, and other commercial spacing may implement load balancing across various thermostats at these locations. Since each of these locations frequently bill on demand charges, having a central unit system minimize collective run times on any given billing increment and keep costs low for customers and power requesting low for electric utility companies.

Solar generation out data can also be used by the peak protect module to infer if sunny and therefore the likely current radiant energy absorbed by the monitored property (or temperature coefficient of the monitored property).

The peak protect module can predict the need for upcoming islanding of home from grid and store energy in home battery, pre-cool, heat water, etc. The prediction can be made using weather reports, states of emergency, fires nearby, and power outages nearby.

Additionally, the peak protect module can monitor electric use to determine if TOU plus peak protect, TOU, and real-time pricing may save the customers money. Customers can also directly inform the peak protect module which electric devices they have in their home to inform the control unit 104 and other systems.

Heating coefficient of the home may incorporate the use of data indicating window open/closed, outside temperature, solar data, electric vehicles, and solar batteries.

In some implementations, the peak protect module can address truncated on-cycles. Truncated on-cycles may occur when indoor temperature is too close to minimum temperature and the on-cycle is abbreviated at either the beginning or the end of the cycle (typically beginning). This can result in very short and largely unnecessary on-cycles.

In some implementations, the peak protect module can also improve the temperature adjustment. The peak protect module may use the predicted high temperature for a particular house and assign that house to a particular temperature bin. While the temperature adjustment may be effective, the peak protect module can also increase the number of bins for improved granularity or having a continuous adjustment.

The peak protect module may use a C-factor adjustment improvement. An administrator may set a C-factor to compensate for factors specific to a monitored property (e.g., insulation, solar gain, envelope tightness, size/age of A/C system, etc.). By setting an appropriate C-factor adjustment, the peak protect module may improve over time.

In some implementations, the peak protect module can adjust in an ad-hoc duty-cycle adjustments. If the pre-schedule duty-cycle is inadequate, then the peak protect module can increase or decrease the duty-cycle on the fly.

The peak protect module can implement an emergency maximum temperature adjustment. On days that are very extreme, the peak protect module can increase the max temperature used in the set-point toggling to avoid a "popping out" scenario in which the indoor temperature exceeds the maximum set point that is being implemented by the peak protect module. This may be done similarly to the existing "extreme temperature adjustment" or can be ad-hoc with a notification to the user.

The peak protect module can also implement better cycle-time optimization for TOU. Since no Demand charge with TOU-only rate plans exists, the peak protect does not adhere to the strict billing periods of the utility (usually 30 or 60 minutes). As such, the optimal on-peak cooling scheme for TOU-only residences can prioritize ensuring that the cycle on-time falls within the preferred optimal runtime (e.g., 8-20 minutes). The peak protect module can arbitrarily adjust the off-time to ensure that the on-time stays within this range (e.g. 12 minutes on and 35 minutes off). Additionally, TOU-only customers may want to ensure that there is cooling occurring directly before and directly after the on-peak period with no cooling occurring immediately after the start or immediately before the end of the on-peak period.

In some implementations, the HDSS on HWH may prove to be useful in reducing on-peak power consumption and reducing electricity bills, especially for TOU plus demand rate plans.

The peak protect module can also implement energy offset action in TOU plus demand. For customers on TOU plus demand rate plans, controlling HVAC runtime during on-peak hours may be critically important, but other large appliances can still be used and contribute to the Demand portion of their bill. There are several ways to monitor appliance usage. The idea of an energy-offset action includes when a customer starts using a large appliance other than their A/C during on-peak hours, the peak protect module can detect that usage and subtract that usage from their HVAC budget. For example, a customer may turn on their electric range during on-peak hours, the peak protect module can detect that and reduce the HVAC duty-cycle budget accordingly. This can be done using the appliance awareness sensor on appliances such as a range, clothes dryer, dishwasher, hot water heater, pool pump, etc.

In the "dinner window" example, for customers on a TOU plus demand rate plan who do not have an appliance awareness sensor, but who want to take an offsetting action, the peak protect module can allow a user to set a window of time in which the HVAC runtime budget is reduced to allow for additional non-HVAC usage, such as cooking dinner.

The peak protect module can also be used for solar-tracking. For customers on TOU plus Demand rate plans, adjusting to the solar produced may be critical to keeping the demand portion of the bill in check. The way that the demand charge is calculated for solar customers strongly favors customers who can ensure that their HVAC units are never operating simultaneously (when more than one HVAC unit is present) and who can keep their electricity usage per billing period roughly proportional to their solar production during that period. For example, a customer with two A/C units and a solar install may run an HVAC runtime algorithm that alternates their two A/C units so they are never on at the same time, and that has a higher run-time from 3-4 pm than from 7-8 pm. So on a 105° F. day, the HVAC runtime schedule might look like this (APS): 3:00 PM-4:00 PM: 50% duty-cycle; 4:00 PM-5:00 PM: 40% duty-cycle; 5:00

PM-6:00 PM: 30% duty-cycle; 6:00 PM-7:00 PM: 20% duty-cycle; and, 7:00 PM-8:00 PM: 15% duty-cycle.

Relevant inputs to this "tapering logic" can be current or historical hourly solar production data, or can be simpler, such as nameplate size of install and the orientation of the array relative to due south (we may potentially pull this from application maps for beta). The size of the solar array may dictate the rate of tapering.

The peak protect module can also be used for synchronous temperature polling. Particularly for thermostats on a C-wire (e.g., no battery life considerations), the peak protect module polls for temperature more frequently and in a synchronous manner. The thermostat may report temperature only when manually requested by the user or when it hits a specific threshold. In other implementations, the peak protect module can poll for temperature at every set point change during on-peak hours or more frequently. This allows the peak protect module to measure temperature as a dependent variable reacting to the independent variable of duty-cycle percentage. Polling at every set point change ensures that the temperature readings most often coincide with an operating state change of the thermostat (e.g. cool to off or off to cool transition). This method of polling gives the peak protect module a uniquely capable method for creating a thermal model of the house. A typical thermostat may keep the temperature static and the thermal model is developed by looking at run-time and outside conditions. In contrast, the proposed method keeps the run-time static and creates the thermal model from the change in indoor temperature and outdoor conditions.

In houses with synchronous temperature polling, if extended periods of on or off times exist, the temperatures may be stratified. The outside of houses in summer may warm up faster than where the thermostat is normally set, and this happens when the AC turns on. The temperature of the air is supposed to start cooling down but in some houses, for the first five or 10 minutes, the temperature of air heats up at the thermostat. Additionally, the HVAC is pulling in hotter air from the outer rooms of the house that has yet to be mixed in and measured properly by the thermostat. If the peak protect module does not poll the temperature, the peak protect module may receive skewed data above the average air temperature in the home if extended periods of on/off times exist.

If the peak protect module is not polling for temperature at the same point in each of the levels of the thermostat, the temperature may not be reflective of actual temperature in the house in terms of total energy transfer. By moving to a synchronous model and having a same cycle model, the peak protect module can poll for temperature at the same point in every cycle, which may be a more accurate method of getting a real temperature view of the monitored property. Additionally, because the peak protect module is cycling more frequently, the air is going to be mixed better, which may result in a more accurate temperature reading. When the peak protect module has synchronous data, and a synchronous method of cooling, this opens up the opportunity to apply control theory methods that can better monitor these iterative processes. The concept of having synchronous data may be in-line with how control methods operate. More accurate temperature data opens the door for better feedback algorithms to pinpoint the correct duty-cycle. First few cycles of on-peak period is learning and adjusting then the peak protect module identifies a more static on-peak duty-cycle.

FIG. 4 is a flowchart of an example process 400 for determining a duty-cycle for a thermostat to operate in order to implement the smart scheduling system during on-peak hours. Generally, the process 400 includes obtaining temperature data from a monitored property; generating an energy model of the monitored property based on the obtained temperature data; in response to a predetermined amount of time before a start of on-peak hours, obtaining current temperature data from the monitored property; providing the current temperature data to the generated energy model to generate a duty-cycle for turning an HVAC system of the monitored property off and on during the on-peak hours; and, instructing the HVAC system of the monitored property to cycle off and on based on the generated duty-cycle during the on-peak hours.

The process 400 includes obtaining temperature data from a monitored property (402). For example, the control unit may obtain data from the thermostat module. The data can include, for example, prior temperature data from the monitored property. The prior temperature data can be recorded over previous time periods, e.g., an hour, a day, a week, and so on. The temperature data can be recorded from inside the monitored property and outside the monitored property. Additionally, the control unit can obtain other data about the monitored property. The other data can include a size of the monitored property and an airflow produced in the monitored property. For example, the size of the monitored property can be measured in square feet, such as 2000 square feet. The airflow produced in the monitored property can be measured on a per room basis. For example, the control unit can obtain measurements that indicate the airflow in a particular room can measure between 200 to 5000 cubic feet per minute, depending on the size of the room. Other measurement values are also possible.

The process 400 includes generating an energy model of the monitored property based on the obtained temperature data (404). For example, the control unit may generate the energy model of the monitored property based on the obtained temperature data. In particular, the control unit can train a machine-learning model using the obtained temperature data to identify a particular duty-cycle for the monitored property to be used during on-peak hours. The duty-cycle can be used to instruct an HVAC system to turn off and on during the time period in which a utility company can charge the corresponding customer a maximum power consumption rate across the time period. Additionally, by instructing the HVAC system to turn off and on based on the generated duty-cycle, the control unit can reduce a maximum power consumption used for a particular monitored property across smaller time periods over an overall larger time period, e.g., on-peak period. In other words, the control unit still enables the same amount of power consumption across the entire on-peak period, but the amount of power consumption is spaced out across smaller or shorter periods of the entire on-peak period in order to reduce the maximum amount of power consumption or reduce a rate of power consumption.

In some implementations, the control unit can train the machine-learning model using the obtained temperature data and previous on-peak hours. For example, the control unit can pair the obtained temperature data and time frames of the previous on-peak hours to train the machine-learning model to identify a particular duty cycle. The particular duty-cycle can represent, for example, how often the HVAC is on and off—a 50% duty-cycle for the entire duration of the on-peak period (e.g., 30 minutes HVAC on and 30 minutes HVAC off in an hour). The function of the training is to minimize the run time needed during on peak hours to utilize a full width of customers' "energy saver" set-points minimum just before high TOU rate and maximum temperature at end of high TOU rate. In this manner, by setting a duty-cycle, the control unit assists the customer by splitting up the run time into shorter periods to save the customer costs. Moreover, the control unit implements the duty-cycle rate to split up the HVAC run time during the on-peak period into shorter periods to reduce any peak in energy consumption. The control unit disperses energy consumption into shorter periods because a peak in energy consumption during the on-peak period results in a higher cost for the customer. For example, an HVAC system may run at 100% to reduce the temperature to a particular temperature one hour before a customer arrives at their property, resulting in a high peak of energy consumption. This process may result in the same temperature as running the HVAC system at 50% for a two-hour period before someone arrives as their property. The latter example may run for longer but exhibits smaller energy consumption peaks, ultimately reducing the costs for the customer. Although more heat may be lost during the two-hour period, the control unit implements the duty-cycle to reduce any peak for any one hour period during the on-peak period. For example, the control unit can examine the loads of all the devices in the monitored property (HVAC, water heater, electric vehicle, appliances at the monitored property, etc.) and determine if any of these devices need constant run time to meet comfort model predictions given energy model constraints. If this is not the case, then the control unit can split up run times for each of these devices so that these devices do not all pull energy at the same time, causing a spike in energy requests. Ultimately, by splitting up run times, the control unit can minimize the cost of a customer's energy bill and reduce an amount of load across the energy grid, which may be strained during an on-peak period in various geographic portions. The control unit can continuously train the machine-learning model against the constraint of minimizing the cost of the customer's energy bill across on-peak hours.

The control unit obtains current temperature data from the monitored property (406). The current temperature data can include, for example, at least one of an outdoor temperature at the monitored property, an indoor temperature at the monitored property, a rate of change of the indoor temperature at the monitored property. The current temperature data can indicate to the control unit whether to implement a pre-cooling effect. In some implementations, the control unit can obtain the current temperature data in response to a predetermined amount of time before a start of the on-peak hours. Additionally, the current temperature data indicates to the trained machine-learning model, e.g., the energy model, an amount of duty-cycle to create to aid in determining how frequent the HVAC system should run to meet a desired temperature during the upcoming on-peak hours against the constraint of minimizing the cost of the customer's energy bill across on-peak hours.

In some implementations, the control unit can determine a start time of the on-peak hours. The start time of the on-peak hours can be based on information provided by a utility company, for example. The control unit can also determine an end time of the on-peak hours based on information provided by the utility company. In this case, the control unit can determine a predetermined length of the on-peak hours.

Additionally, the control unit can determine an amount of time it takes the monitored property to adjust from a first temperature to a second temperature during certain times of the day in particular regions. The control unit can determine this amount of time remains valid as long as the difference from the first temperature to the second temperature is within a threshold value, e.g., 5 degrees F. For example, the control unit can determine that the monitored property can adjust from 71 degrees Fahrenheit to 75 degrees Fahrenheit in 30 minutes from 8:00 AM to 10:00 AM and 15 minutes from 5:00 PM to 7:00 PM in the southwestern part of the United States. Outside of the threshold value, e.g., 5 degrees Fahrenheit different, the adjustment between the two temperatures can take longer than 30 minutes and 15 minutes, at the respective timeframes. Continuing with this example, the control unit can determine that the on-peak hours starts at 5:30 PM and lasts until 8:30 PM and a desired temperature of 75 degrees Fahrenheit is to be reached. Because the control unit has determined that the monitored property can adjust between two different temperatures in 15 minutes between 5:00 PM and 7:00 PM and the current temperature of the property is 85 degrees Fahrenheit, the control unit can decide to implement the pre-cooling method before the on-peak hours to reach a temperature of 80 degrees before the on-peak hours start, which is within the threshold difference value of 5 degrees Fahrenheit. Then, during the on-peak hours, the control unit only needs to move the temperature 5 degrees, e.g., between 80 degrees to 75 degrees, which ultimately reduces the overall energy consumption, energy cost, and load on the electric grid. Further, the control unit can instruct the HVAC system with a duty cycle during the on-peak period, which reduces the energy consumption even further, by splitting up the HVAC energy consumption of a 5-degree temperature difference across multiple time periods during the on-peak period. The control unit can execute a pre-cooling method that instructs the HVAC system to reach a set temperature in the monitored property before the on-peak hours to help reduce the overall consumption of energy during the on-peak period.

In some implementations, the control unit can determine a time when to implement the pre-cooling method. For example, the control unit can dynamically determine when to implement the pre-cooling method, such as when a user has started to drive home based on communication with the user's client device, e.g., position, speed, and direction of movement. The control unit may be able to determine a distance and an elapsed time before the user's arrival, determine whether a pre-cooling method can be implemented before on-peak hours start, and based on the determining, initiate a pre-cooling method to reduce the overall temperature in the user's home. The pre-cooling method may cease upon a start of the on-peak hours In some implementations, the control unit may initiate a time of the pre-cooling method before a start time of the on-peak hours. To reduce the overall grid constrain, the control unit may start the pre-cooling method for a particular property well in advance of the on-peak hours, such as one or two hours before, to name a few examples. Alternatively, the control unit may start the pre-cooling method for a particular property such that the property reaches a desired temperature at the start time of the on-peak hours. For example, if the control unit can determine an amount of time for the monitored property to move between temperatures, then the control unit can initiate the pre-cooling method the determined amount of time from the start time of the on-peak hours.

The control unit can provide the current temperature data to the generated energy model to generate a duty-cycle for turning an HVAC system of the monitored property off and on during on-peak hours (408). For example, the control unit can provide the current temperature data of 71 degrees F. to the generated energy model, and the generated energy model can output a duty cycle of 65%. In some examples, the control unit can select a duty-cycle based on a pre-determined value, e.g., an implementer set value. In some examples, the control unit can select a duty-cycle based on a learned value over time. In some examples, the control unit can provide an interface to a client device and receive an indication from the client device of a homeowner that instructs the control unit to use specific duty cycle for operating the HVAC system. In this example, the specific duty cycle requested or instructed by the homeowner can override the duty cycle generated by the energy model.

The control unit can instruct the HVAC system of the monitored property to cycle off and on based on the generated duty-cycle during the on-peak hours (410). For example, in response to a time during a start of the on-peak hours, the control unit can instruct the HVAC system to operate at a 50% duty-cycle per hour to reach a desired temperature during the on-peak hours. In this example, the HVAC system is on for 30 minutes and off for 30 minutes during the on-peak hours until a desired temperature of 69 degrees Fahrenheit is met. Other examples and duty-cycles are also possible.

In some implementations, the control unit can determine whether the generated or instructed duty-cycle is the correct duty-cycle. For example, the control unit can instruct the HVAC system to duty-cycle between a first temperature and a second temperature during the on-peak hours. The first temperature can be 61 F and the second temperature can be 70 degrees F. In this example, the control unit instructs the HVAC system to cycle between 61 F and 70 F using a 50% duty-cycle and before the on-peak hours, the control unit instructs the HVAC system to implement a pre-cooling method to the 70 F because the temperature of the monitored property is currently 75 F. Then, following the pre-cooling method and during the cycling of the temperature during the on-peak hours, the HVAC system continues to cool the monitored property during the on-peak hours to 61 F with the duty-cycle of 50%. The control unit can monitor a proximity to which an actual temperature of the monitored property reaches the first temperature, e.g., 61 F, during the course of the on-peak hours.

In some implementations, the control unit can take additional processes in case the monitored property will not reach the target temperature with the designated duty-cycle. Specifically, the control unit can adjust the duty-cycle on the fly if the control unit determines the monitored property will not reach the desired or target temperature. For example, if the duty-cycle is currently set to 10% and the control unit determines the monitored property will not reach the desired temperature, the control unit can adjust the duty-cycle to 85% on the fly to ensure the monitored property reaches the desired temperature. If the control unit needs to adjust the duty-cycle on the fly due to the case that the monitored property will not reach the desired temperature, then the control unit can retrain its machine-learning model with the (i) incorrect duty cycle, (ii) the newly adjusted duty cycle, and (iii) temperature data of the property.

In some implementations, the control unit can take additional processes in case the monitored property will not reach the target temperature during a time period identified by the on-peak period with the designated duty-cycle. For example, the control unit can adjust the duty-cycle on the fly, such as by, increasing the duty cycle to a new value. If the control unit adjusts the duty-cycle on the fly, the control unit can use the data identified above to retrain the train machine-learning model, e.g., the (i) incorrect duty cycle, (ii) the newly adjusted duty cycle, and (iii) temperature data of the property. In another example, the control unit can remove the duty-cycle and enable the HVAC system to remain on at 100% until the desired temperature is reached. Additionally, the control unit can turn off the HVAC system and not use the duty-cycle once the temperature in the property reaches the desired temperature.

Figure 5:
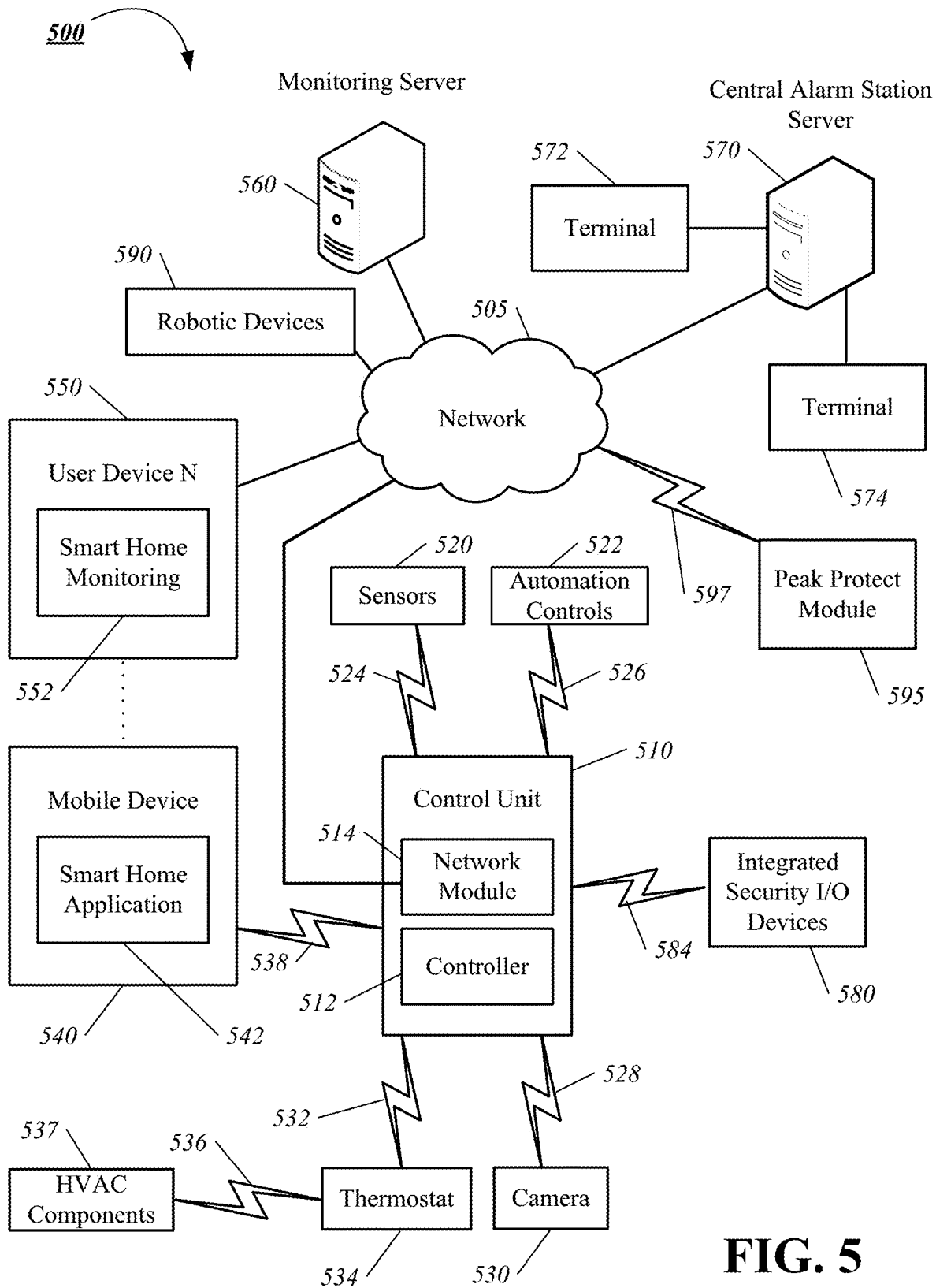
FIG. 5 is a block diagram of an example of a home monitoring system that may utilize various components to monitor an HVAC.

FIG. 5 is a block diagram of an example of a home monitoring system 500 that may utilize various components to monitor an HVAC. The HVAC system 500 includes a network 505, a control unit server 510, one or more user devices 540 and 550, a monitoring application server 560, and a central alarm station server 570. In some examples, the network 505 facilitates communications between the control unit server 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications between the control unit server 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit server 510 includes a controller 512 and a network module 514. The controller 512 is configured to control an HVAC system that includes the control unit server 510. In some examples, the controller 512 may include a processor or other control circuitry configured to execute instructions of a program that controls operation of an HVAC system. In these examples, the controller 512 may be configured to receive input from sensors, thermostats, or other devices included in the HVAC system and control operations of devices included in the household (e.g., a shower head, a faucet, a dishwasher, etc.). For example, the controller 512 may be configured to control operation of the network module 514 included in the control unit server 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit server 510 to communicate over a local area network and/or the Internet. The network module 514 also may be a voiceband modem configured to enable the alarm panel to communicate over the telephone lines of Plain Old Telephone Systems (POTS).

The HVAC system that includes the control unit server 510 includes one or more sensors. For example, the monitoring system may include multiple sensors 520. The sensors 520 may include a temperature sensor, a humidity sensor, a leaking sensor, or any other type of sensor included in an HVAC system 146 system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The control unit server 510 communicates with the automation module 522 and the camera 530 to perform monitoring. The automation module 522 is connected to one or more devices that enable home automation control. For instance, the automation module 522 may be connected to one or more lighting systems and may be configured to control operation of the one or more lighting systems. Also, the automation module 522 may be connected to one or more electronic locks at the property and may be configured to control operation of the one or more electronic locks (e.g., control Z-Wave locks using wireless communications in the Z-Wave protocol. Further, the automation module 522 may be connected to one or more appliances at the property and may be configured to control operation of the one or more appliances. The automation module 522 may include multiple modules that are each specific to the type of device being controlled in an automated manner. The automation module 522 may control the one or more devices based on commands received from the control unit server 510. For instance, the automation module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or within a HVAC system monitored by the control unit server 510. The camera 530 may be configured to capture single, static images of the area and also video images of the area in which multiple images of the area are captured at a relatively high frequency (e.g., thirty images per second). The camera 530 may be controlled based on commands received from the control unit server 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit server 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the control unit server 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit server 510 and can control the environmental (e.g., temperature) settings based on commands received from the control unit server 510.

In some implementations, the thermostat 534 is a dynamically programmable thermostat and can be integrated with the control unit server 510. For example, the dynamically programmable thermostat 534 can include the control unit server 510, e.g., as an internal component to the dynamically programmable thermostat 534. In addition, the control unit server 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes one or more integrated security devices 580. The one or more integrated security devices may include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580.

The system 500 further includes one or more peak protect modules 595. The one or more peak protect modules may include any type of device used to implement software and communicate with of the devices connected over network 505, including sensors 520, automation controls 522, the integrated security I/O devices 580, the camera 530, the thermostat 534, the HVAC components 537, and the mobile device 540. For example, the one or more peak protect modules may instruct the thermostat 534 and the HVAC components 537 to operate at 50% duty-cycle during on-peak hours. The peak protect module 595 can be configured to communicate the network 505 over the communication link 597. The communication link 597 may be a wired or wireless data pathway configured to transmit signals from the peak protect module 595 to the various devices connected over network 505.

The sensors 520, the module 522, the camera 530, the thermostat 534, and the integrated security devices 580 communicate with the controller 512 over communication links 524, 526, 528, 532, 584, and 586. The communication links 524, 526, 528, 532, 584, and 586 may be a wired or wireless data pathway configured to transmit signals from the sensors 520, the module 522, the camera 530, the thermostat 534, and the integrated security devices 580 to the controller 512. The sensors 520, the module 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 584, and 586 may include a local network. The sensors 520, the module 522, the camera 530, the thermostat 534, and the integrated security devices 580 and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 is an electronic device configured to provide monitoring services by exchanging electronic communications with the control unit server 510, the one or more user devices 540 and 550, and the central alarm station server 570 over the network 505. For example, the monitoring application server 560 may be configured to monitor events (e.g., alarm events) generated by the control unit server 510. In this example, the monitoring application server 560 may exchange electronic communications with the network module 514 included in the control unit server 510 to receive information regarding events (e.g., HVAC control events) detected by the control unit server 510. The monitoring application server 560 also may receive information regarding events (e.g., HVAC events) from the one or more user devices 540 and 550.

In some examples, the monitoring application server 560 may route HVAC data received from the network module 514 or the one or more user devices 540 and 550 to the central alarm station server 570. For example, the monitoring application server 560 may transmit the HVAC data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the control unit server 510 or the one or more user devices 540 and 550.

The central alarm station server 570 is an electronic device configured to provide alarm monitoring service by exchanging communications with the control unit server 510, the one or more mobile devices 540 and 550, and the monitoring application server 560 over the network 505. For example, the central alarm station server 570 may be configured to monitor HVAC events generated by the control unit server 510. In this example, the central alarm station server 570 may exchange communications with the network module 514 included in the control unit server 510 to receive information regarding HVAC events detected by the control unit server 510. The central alarm station server 570 also may receive information regarding HVAC events from the one or more mobile devices 540 and 550 and/or the monitoring application server 560.

The central alarm station server 570 is connected to multiple terminals 572 and 574. The terminals 572 and 574 may be used by operators to process HVAC events. For example, the central alarm station server 570 may route HVAC data to the terminals 572 and 574 to enable an operator to process the HVAC data. The terminals 572 and 574 may include general-purpose computers (e.g., desktop personal computers, workstations, or laptop computers) that are configured to receive HVAC data from a server in the central alarm station server 570 and render a display of information based on the HVAC data. For instance, the controller 512 may control the network module 514 to transmit, to the central alarm station server 570, HVAC data indicating that a sensor 520 detected a flow rate of air in the air-handling unit 152. The central alarm station server 570 may receive the HVAC data and route the HVAC data to the terminal 572 for processing by an operator associated with the terminal 572. The terminal 572 may render a display to the operator that includes information associated with the HVAC event (e.g., the flow rate, the air duct the flow rate came from, the temperature of the air in the air duct, etc.) and the operator may handle the HVAC event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the control unit server 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit server 510 using the communication link 538. For instance, the one or more user devices 540 and 550 may communicate with the control unit server 510 using various local wireless protocols such as Wi-Fi, Bluetooth, Z-Wave, Zigbee, HomePlug (ethernet over powerline), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit server 510, the one or more user devices 540 and 550 may communicate directly with the sensors and other devices controlled by the control unit server 510. In some implementations, the one or more user devices 540 and 550 replace the control unit server 510 and perform the functions of the control unit server 510 for local monitoring and long range/offsite communication.

In other implementations, the one or more user devices 540 and 550 receive monitoring system data captured by the control unit server 510 through the network 505. The one or more user devices 540, 550 may receive the data from the control unit server 510 through the network 505 or the monitoring application server 560 may relay data received from the control unit server 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit server 510 directly (e.g., through link 538) or through the monitoring application server 560 (e.g., through network 505) based on a location of the one or more user devices 540 and 550. For instance, when the one or more user devices 540 and 550 are located close to the control unit server 510 and in range to communicate directly with the control unit server 510, the one or more user devices 540 and 550 use direct communication. When the one or more user devices 540 and 550 are located far from the control unit server 510 and not in range to communicate directly with the control unit server 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, and the camera 530. The one or more user devices 540 and 550 receive data directly from the sensors 520, the module 522, and the camera 530 and sends data directly to the sensors 520, the module 522, and the camera 530. The one or more user devices 540, 550 provide the appropriate interfaces/processing to provide visual surveillance and reporting.

In other implementations, the system 500 further includes network 505 and the sensors 520, the module 522, the camera 530, and the thermostat 534 are configured to communicate sensor and image data to the one or more user devices 540 and 550 over network 505 (e.g., the Internet, cellular network, etc.). In yet another implementation, the sensors 520, the module 522, the camera 530, and the thermostat 534 (or a component, such as a bridge/router) are intelligent enough to change the communication pathway from a direct local pathway when the one or more user devices 540 and 550 are in close physical proximity to the sensors 520, the module 522, the camera 530, and the thermostat 534 to a pathway over network 505 when the one or more user devices 540 and 550 are farther from the sensors 520, the module 522, the camera 530, and the thermostat 534. In some examples, the system leverages GPS information from the one or more user devices 540 and 550 to determine whether the one or more user devices 540 and 550 are close enough to the sensors 520, the module 522, the camera 530, and the thermostat 534 to use the direct local pathway or whether the one or more user devices 540 and 550 are far enough from the sensors 520, the module 522, the camera 530, and the thermostat 534 that the pathway over network 505 is required. In other examples, the system leverages status communications (e.g., pinging) between the one or more user devices 540 and 550 and the sensors 520, the module 522, the camera 530, and the thermostat 534 to determine whether communication using the direct local pathway is possible. If communication using the direct local pathway is possible, the one or more user devices 540 and 550 communicate with the sensors 520, the module 522, the camera 530, and the thermostat 534 using the direct local pathway. If communication using the direct local pathway is not possible, the one or more user devices 540 and 550 communicate with the sensors 520, the module 522, the camera 530, and the thermostat 534 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
obtaining, by one or more processors, temperature data from a monitored property;
generating, by the one or more processors, an energy model of the monitored property based on the obtained temperature data;
obtaining, by the one or more processors, current temperature data from the monitored property;
prior to a time period during on-peak hours, instructing, by the one or more processors, a Heating Ventilation and Air Conditioning (HVAC) system of the monitored property to execute a pre-cooling or a pre-heating method, wherein the pre-cooling or the pre-heating method instructs the HVAC system to reach a set temperature in the monitored property before on-peak hours;
providing, by the one or more processors, the current temperature data to the generated energy model to generate a duty-cycle for cycling the HVAC system of the monitored property between a first temperature and a second temperature during on-peak hours;
instructing, by the one or more processors, the HVAC system to cycle between the first temperature and the second temperature during the on-peak hours, wherein (i) the generated duty-cycle is cycled between the first temperature and the second temperature and (ii) the set temperature of the pre-cooling or the pre-heating method corresponds to the second temperature;
in response to instructing the HVAC system of the monitored property to cycle between the first temperature and the second temperature based on the generated duty-cycle, monitoring, by the one or more processors, a proximity to which an actual temperature of the monitored property reaches the first temperature iteratively; and adjusting, by the one or more processors, the generated duty-cycle based on the proximity to which the actual temperature of the monitored property reaches the first temperature.

2. The computer-implemented method of claim 1, further comprising:

in response to a predetermined amount of time before a start of the on-peak hours, obtaining, by the one or more processors, the current temperature data from the monitored property, wherein the current temperature data comprises at least one of an outdoor temperature at the monitored property, an indoor temperature at the monitored property, a rate of change of the indoor temperature at the monitored property.

3. The computer-implemented method of claim 1, wherein the on-peak hours corresponds to a time period in which a utility company can charge a customer a maximum power consumption rate across the time period.

4. The computer-implemented method of claim 1, further comprising:

in response to an end of the on-peak hours and the HVAC system of the monitored property cycling based on the generated duty-cycle, setting, by the one or more processors, a desired temperature of the monitored property that mitigates a whip back effect of an electric grid.

5. The computer-implemented method of claim 1, wherein obtaining the temperature data from the monitored property further comprises obtaining, by the one or more processors, a size of the monitored property, an amount of airflow produced in the monitored property, and a temperature outdoor the monitored property.

6. The computer-implemented method of claim 1, further comprising:

providing, by the one or more processors, a user interface to a client device of a user associated with the monitored property;

receiving, by the one or more processors, an indication from the client device of a specific duty-cycle for the HVAC system; and instructing, by the one or more processors, the HVAC system of the monitored property to cycle off and on based on the specific duty-cycle selected by the user.

7. The computer-implemented method of claim 1, wherein the second temperature is greater than the first temperature.

8. A system comprising:

one or more computers and one or more storage devices storing instructions that are operable, when executed by the one or more computers, to cause the one or more computers to perform operations comprising:

obtaining, by one or more processors, temperature data from a monitored property;

generating, by the one or more processors, an energy model of the monitored property based on the obtained temperature data;

obtaining, by the one or more processors, current temperature data from the monitored property;

prior to a time period during on-peak hours, instructing, by the one or more processors, a Heating Ventilation and Air Conditioning (HVAC) system of the monitored property to execute a pre-cooling or a pre-heating method, wherein the pre-cooling or the pre-heating method instructs the HVAC system to reach a set temperature in the monitored property before on-peak hours;

providing, by the one or more processors, the current temperature data to the generated energy model to generate a duty-cycle for cycling the HVAC system of the monitored property between a first temperature and a second temperature during on-peak hours;

instructing, by the one or more processors, the HVAC system to cycle between the first temperature and the second temperature during the on-peak hours, wherein (i) the generated duty-cycle is cycled between the first temperature and the second temperature and (ii) the set temperature of the pre-cooling or the pre-heating method corresponds to the second temperature;

in response to instructing the HVAC system of the monitored property to cycle between the first temperature and the second temperature based on the generated duty-cycle, monitoring, by the one or more processors, a proximity to which an actual temperature of the monitored property reaches the first temperature iteratively; and adjusting, by the one or more processors, the generated duty-cycle based on the proximity to which the actual temperature of the monitored property reaches the first temperature.

9. The system of claim 8, further comprising:

in response to a predetermined amount of time before a start of the on-peak hours, obtaining, by the one or more processors, the current temperature data from the monitored property, wherein the current temperature data comprises at least one of an outdoor temperature at the monitored property, an indoor temperature at the monitored property, a rate of change of the indoor temperature at the monitored property.

10. The system of claim 8, wherein the on-peak hours corresponds to a time period in which a utility company can charge a customer a maximum power consumption rate across the time period.

11. The system of claim 8, further comprising:

in response to an end of the on-peak hours and the HVAC system of the monitored property cycling based on the generated duty-cycle, setting, by the one or more processors, a desired temperature of the monitored property that mitigates a whip back effect of an electric grid.

12. The system of claim 8, wherein obtaining the temperature data from the monitored property further comprises obtaining, by the one or more processors, a size of the monitored property, an amount of airflow produced in the monitored property, and a temperature outdoor the monitored property.

13. The system of claim 8, further comprising:

providing, by the one or more processors, a user interface to a client device of a user associated with the monitored property;

receiving, by the one or more processors, an indication from the client device of a specific duty-cycle for the HVAC system; and instructing, by the one or more processors, the HVAC system of the monitored property to cycle off and on based on the specific duty-cycle selected by the user.

14. A non-transitory computer-readable medium storing software comprising instructions executable by one or more computers which, upon such execution, cause the one or more computers to perform operations comprising:

obtaining, by one or more processors, temperature data from a monitored property;

generating, by the one or more processors, an energy model of the monitored property based on the obtained temperature data;

obtaining, by the one or more processors, current temperature data from the monitored property;

prior to a time period during on-peak hours, instructing, by the one or more processors, a Heating Ventilation and Air Conditioning (HVAC) system of the monitored property to execute a pre-cooling or a pre-heating method, wherein the pre-cooling or the pre-heating method instructs the HVAC system to reach a set temperature in the monitored property before on-peak hours;

providing, by the one or more processors, the current temperature data to the generated energy model to generate a duty-cycle for cycling the HVAC system of the monitored property between a first temperature and a second temperature during on-peak hours;

instructing, by the one or more processors, the HVAC system to cycle between the first temperature and the second temperature during the on-peak hours, wherein (i) the generated duty-cycle is cycled between the first temperature and the second temperature and (ii) the set temperature of the pre-cooling or the pre-heating method corresponds to the second temperature;

in response to instructing the HVAC system of the monitored property to cycle between the first temperature and the second temperature based on the generated duty-cycle, monitoring, by the one or more processors, a proximity to which an actual temperature of the monitored property reaches the first temperature iteratively; and adjusting, by the one or more processors, the generated duty-cycle based on the proximity to which the actual temperature of the monitored property reaches the first temperature.

15. The non-transitory computer-readable medium of claim 14, further comprising:

in response to a predetermined amount of time before a start of the on-peak hours, obtaining, by the one or more processors, the current temperature data from the monitored property, wherein the current temperature data comprises at least one of an outdoor temperature at the monitored property, an indoor temperature at the monitored property, a rate of change of the indoor temperature at the monitored property.

16. The non-transitory computer-readable medium of claim 14, wherein the on-peak hours corresponds to a time period in which a utility company can charge a customer a maximum power consumption rate across the time period.

17. The non-transitory computer-readable medium of claim 14, further comprising:

in response to an end of the on-peak hours and the HVAC system of the monitored property cycling based on the generated duty-cycle, setting, by the one or more processors, a desired temperature of the monitored property that mitigates a whip back effect of an electric grid.

* * * * *

UNITED STATES PATENT AND TRADEMARK OFFICE
CERTIFICATE OF CORRECTION

PATENT NO. : 11,709,509 B2
APPLICATION NO. : 17/666901
DATED : July 25, 2023
INVENTOR(S) : Alexander Lawrence Reeder et al.

It is certified that error appears in the above-identified patent and that said Letters Patent is hereby corrected as shown below:

On the Title Page

Column 2 (Abstract), Line 9, delete "an" and insert -- and --.

Signed and Sealed this
Fifth Day of September, 2023

Katherine Kelly Vidal
*Director of the United States Patent and Trademark Office*